US011475306B2

(12) United States Patent
Vantrease et al.

(10) Patent No.: US 11,475,306 B2
(45) Date of Patent: Oct. 18, 2022

(54) PROCESSING FOR MULTIPLE INPUT DATA SETS

(71) Applicant: Amazon Technologies, Inc., Seattle, WA (US)

(72) Inventors: Dana Michelle Vantrease, Austin, TX (US); Ron Diamant, Albany, CA (US); Thomas A. Volpe, Austin, TX (US); Randy Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1203 days.

(21) Appl. No.: 15/933,201

(22) Filed: Mar. 22, 2018

(65) Prior Publication Data

US 2019/0294968 A1 Sep. 26, 2019

(51) Int. Cl.
*G06F 3/08* (2006.01)
*G06F 3/06* (2006.01)
*G06N 3/08* (2006.01)
*G06N 3/04* (2006.01)

(52) U.S. Cl.
CPC ........... *G06N 3/082* (2013.01); *G06F 3/0604* (2013.01); *G06F 3/0644* (2013.01); *G06F 3/0673* (2013.01); *G06N 3/0454* (2013.01)

(58) Field of Classification Search
None
See application file for complete search history.

(56) References Cited

U.S. PATENT DOCUMENTS

| 7,437,727 | B2 | 10/2008 | Leong et al. |
| 8,213,518 | B1 | 7/2012 | Wang et al. |
| 9,442,760 | B2 | 9/2016 | Boutin et al. |

(Continued)

FOREIGN PATENT DOCUMENTS

| CN | 106203619 | 12/2016 |
| CN | 107679620 | 2/2018 |

(Continued)

OTHER PUBLICATIONS

Application No. JP2020-551487, Office Action, dated Dec. 20, 2021, 15 pages.

(Continued)

*Primary Examiner* — Scott C Sun
(74) *Attorney, Agent, or Firm* — Kilpatrick Townsend & Stockton LLP

(57) ABSTRACT

Disclosed herein are techniques for performing multi-layer neural network processing for multiple contexts. In one embodiment, a computing engine is set in a first configuration to implement a second layer of a neural network and to process first data related to a first context to generate first context second layer output. The computing engine can be switched from the first configuration to a second configuration to implement a first layer of the neural network. The computing engine can be used to process second data related to a second context to generate second context first layer output. The computing engine can be set to a third configuration to implement a third layer of the neural network to process the first context second layer output and the second context first layer output to generate a first processing result of the first context and a second processing result of the second context.

13 Claims, 20 Drawing Sheets

(56) References Cited

U.S. PATENT DOCUMENTS

| | | | |
|---|---|---|---|
| 10,019,668 | B1 | 7/2018 | Woo |
| 10,592,280 | B2 | 3/2020 | Ballantyne et al. |
| 2010/0174876 | A1 | 7/2010 | Kasahara et al. |
| 2014/0181839 | A1 | 6/2014 | Xu et al. |
| 2016/0034836 | A1 | 2/2016 | Leem et al. |
| 2016/0048413 | A1 | 2/2016 | Matsuyama et al. |
| 2017/0091619 | A1 | 3/2017 | Towal et al. |
| 2017/0116498 | A1 | 4/2017 | Raveane et al. |
| 2017/0344882 | A1 | 11/2017 | Ambrose et al. |
| 2019/0057300 | A1* | 2/2019 | Mathuriya ............... G06N 3/04 |

FOREIGN PATENT DOCUMENTS

| | | |
|---|---|---|
| CN | 107798382 | 3/2018 |
| EP | 3098762 | 11/2016 |
| JP | 2019531535 A | 10/2019 |

OTHER PUBLICATIONS

Wiggers et al., "Buffer Capacity Computation for Throughput Constrained Streaming Applications with Data-Dependent Inter-Task Communication", IEEE Real-Time and Embedded Technology and Applications Symposium, 2008, pp. 183-194.

Vantrease, et al. U.S. Appl. No. 15/933,225, filed Mar. 22, 2018, titled Scheduling Network Computations.

Ramakrishnan et al., "Scheduling Data-Intensive Workflows onto Storage-Constrained Distributed Resources", Seventh IEEE International Symposium on Cluster Computing and the Grid (CCGrid '07),, 2007, pp. 401-409.

Sell et al., "The Xbox One System on a Chip and Kinect Sensor", IEEE Micro, vol. 34, Issue 2, 2014, pp. 44-53.

Wiggers et al., "Computation of Buffer capacities for throughput Constrained and Data Dependent Inter-Task Communication", In Proceedings of the conference on Design, automation and test in Europe, Association for Computing Machinery, New York, 2008, pp. 640-645.

Kukunas , "Power and Performance: Software Analysis and Optimization", Jan. 2015, pp. 36-37.

Li et al., "A High Performance FPGA-Based Accelerator for Large-scale Convolutional Neural Networks", 26th International Conference on Field Programmable Logic and Applications (FPL), Aug. 2016, pp. 1-9.

Sabuncuoglu et al., "A Neural Network Model for Scheduling Problems", European Journal of Operational Research, vol. 93, Issue 2, Available Online at: http://yoksis.bilkent.edu.tr/pdf/files/1237.pdf, Sep. 6, 1996, pp. 288-299.

Yoshida et al., "Data-Localization Scheduling Inside Processor-Cluster for Multigrain Parallel Processing", IEICE Transactions on Information and Systems, vol. 80, No. 4, Apr. 25, 1997, pp. 473-479.

Alwani et al., "Fused-Layer CNN Accelerators", 49th Annual IEEE/ACM International Symposium On Microarchitecture, 2016, pp. 1-12.

Chakradhar et al., "A Dynamically Configurable Coprocessor for Convolutional Neural Networks", ACM Sigarch Computer Architecture News, ACM Special Interest Group on Computer Architecture, vol. 38, No. 3, 2010, pp. 247-257.

PCT/US2019/022973 , "International Search Report and Written Opinion", dated Jun. 18, 2019, 15 pages.

Shen et al., "Escher: A Cnn Accelerator with Flexible Buffering to Minimize Off-Chip Transfer", IEEE 25th Annual International Symposium on Field-Programmable Custom Computing Machines, 2017, pp. 93-100.

Shen et al., "Maximizing CNN Accelerator Efficiency Through Resource Partitioning", Proceedings of the 44th Annual International Symposium on Computer Architecture, 2017, pp. 535-547.

JP2020-551487, "Notice of Allowance", dated Jun. 17, 2022, 6 pages.

* cited by examiner

PROCESSING FOR MULTIPLE INPUT DATA SETS

BACKGROUND

Artificial neural networks are computing systems with an architecture based on biological neural networks. Artificial neural networks can be trained, using training data, to learn about how to perform a certain computing task. For example, the training data may include image data associated with a pre-determined object. The trained artificial neural networks can process multiple images (or multiple sets of images) representing different contexts (e.g., captured at different locations, at different times, by different persons, carrying different information, etc.) to determine whether an image or a set of images contain image data of the pre-determined object.

A neural network may include a set of processing nodes. Each processing node can process a piece of the input data to generate an output, and the final decision can be generated based on a combination of the outputs of the set of processing nodes. As part of the processing, each processing node can perform a set of arithmetic operations such as, for example, floating-point multiplications and additions, etc. The arithmetic operations of the processing nodes may be performed by circuitries and data paths optimized for high speed arithmetic operations, such as graphical processing units (GPU).

DETAILED DESCRIPTION

Figure 1:
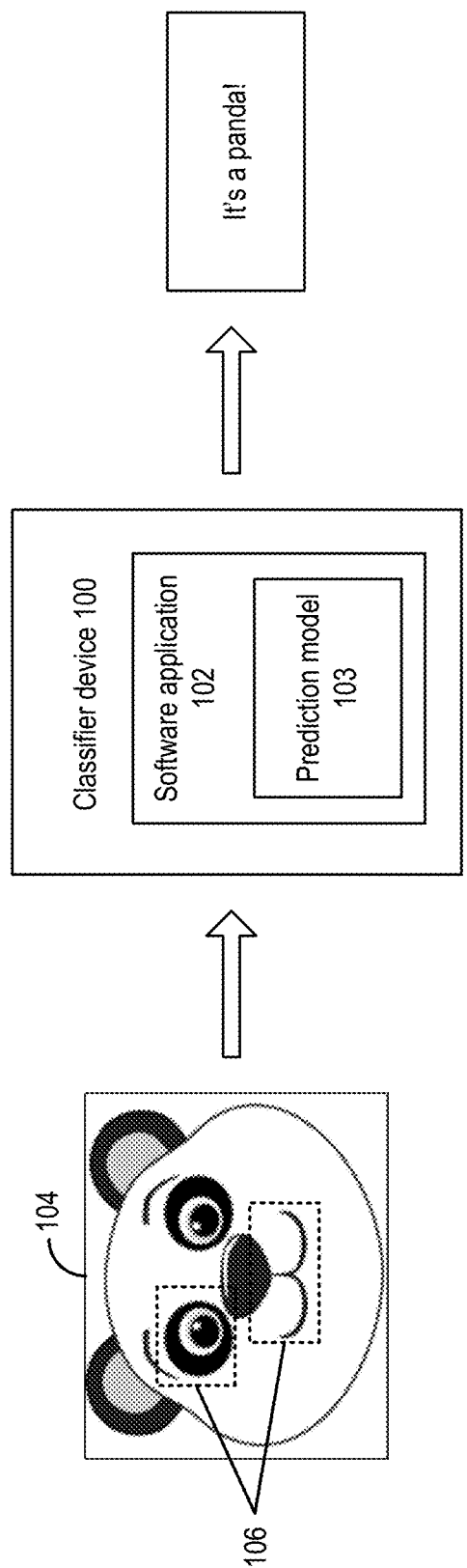
FIG. 1 illustrates an example data processing device that uses techniques disclosed herein to process an image.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Embodiments of the present disclosure relate to a method of operating a computing engine to perform computations for a multi-layer neural network for multiple contexts. The multi-layer neural network may include a first neural network layer, a second neural network layer that receives data from the first neural network layer, and a third neural network layer that receives data from the second neural network layer. In one example, the computing engine can be configured as the first neural network layer to perform computations for a first context, and then be configured as the second neural network layer to perform computations for the first context, and the output of the second neural network layer computations for the first context can be stored. The computing engine can then be switched back to the first neural network layer to perform computations for a second context, and then be configured as the second neural network layer to perform computations for the second context. The output of the second neural network layer computations for the second context can be stored. The computing engine can then be configured as the third neural network layer to perform computations for the first context and for the second context in parallel.

Embodiments of the present disclosure also relate to a method of scheduling the operations at a computing engine for performing multi-layer neural network computations for multiple contexts. Referring to the example above, the scheduling method may comprise determining execution batches for the computations of different neural network layers for different contexts. The scheduling may start from the highest level neural network layer (e.g., the third neural network layer) and determine one or more execution batches for the highest level neural network layer. One or more execution batches for the layer below (e.g., the second neural network layer) can then be determined and scheduled before the execution batches for the highest level neural network layer. The determination of the execution batches can be based on available buffer space. If the buffer cannot provide the needed space for computations of one neural network layer for all contexts, the computations can be split into a plurality of batches, and the splitting can be performed such that the buffer can provide sufficient space to store the output data generated from earlier execution batches (which are to be provided for future execution batches), as well as input and output data of the batch being executed.

An artificial neural network (herein after "neural network") may include multiple processing nodes. For a deep neural network (DNN), the processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. The processing nodes in the intermediate layers may combine the scaled elements received from each processing node of the input layer to compute a set of intermediate outputs. For example, each processing node in the intermediate layers may compute a sum of the element-weight products, and then generate an intermediate output by applying an activation function to the sum. The intermediate outputs from each processing node of one intermediate layer may be considered as an activated vote (or no-vote), associated with a weight indicating the vote's influence, to determine the intermediate output of the next intermediate layer. The output layer may generate a sum of the scaled intermediate outputs from the final intermediate layer, and generate a binary output (e.g., "yes" or "no") based on whether the sum of the scaled intermediate outputs exceeds a threshold. Due to the combination of scaled elements between layers, the sizes of the higher layers (e.g., the output layer, the intermediate layers immediately before the output layer, etc.) typically are smaller than the sizes of the lower layers (e.g., the input layer, the intermediate layers immediately after the input layer, etc.).

As discussed below, the processing nodes may be implemented by circuitries and data paths optimized for high speed arithmetic operations, such as graphical processing units (GPU). For example, the circuitries may include an array of computation units linked together via a data path. A computation unit may obtain one or more weights and one or more inputs from a buffer to perform scaling operations (e.g., scaling the inputs with the set of weights) and/or addition operations (e.g., combining the scaled inputs received from another computation unit). To perform multi-layer neural network processing, the data path can be configured to obtain different sets of weights and inputs associated with different neural network layers from the buffer at different times, and forward the weights and inputs to the computation units to perform the computations. For example, in a first time period, the computation units may be configured as the input layer, and the data path can be configured to obtain a first set of weights and an input data set from a buffer and forward the first set of weights and input data set to the computation units. The computation units can perform the scaling and combination operations to compute a first set of intermediate outputs, and store the first set of intermediate outputs at the buffer separately from the weights and input data sets to avoid overwriting the weights and input data sets that are to be delivered to the computation units. In a second time period, the computation units may be configured as the first intermediate layer to compute a second set of intermediate outputs, and the data path can be configured to obtain the first set of intermediate outputs and a second set of weights from the buffer, and to send the first set of intermediate outputs and the second set of weights to the computation units to perform the computations. The processing can be repeated until the computation units perform the computations for the output layer.

Although such arrangements can reduce a number of computation units required to perform neural network processing, the utilization rate of the computation units may degrade during the processing. For example, as discussed above, the sizes of the higher layers are typically smaller than the sizes of the lower layers. In a case where the array of computation units is configured to perform neural network processing for a single set of input data, as the data propagates from the lower layers to the higher layers, the number of computation units involved in the computations may decrease. Some of the computation units that were involved in the computations for the lower layers may become idle when the computations for the higher layers are being performed, leading to a degradation in the utilization rate of the computation units.

To achieve higher utilization rate, the array of computation units can be configured to process multiple input data sets (or input data associated with different contexts) in a lock-step manner. For example, the array of computation units can be configured to perform computations for a lower layer (e.g., the input layer, a lower intermediate layer, etc.) for each context sequentially, where the computations for the lower layer involve larger input data sets and weight sets and may require more computation units and more buffer space.

After the lower layer computations are completed, the results of the computation can be stored at the buffer. The array of computation units can then be configured to perform parallel computations for multiple contexts for the next layer (e.g., higher intermediate layers, the output layer, etc.) based on the results of computations of the lower layer stored at the buffer. The computations for the next layer may involve smaller input data sets and weight sets and can be handled by a smaller number of computation units, and the buffer can also accommodate the input and output data for the next layer computations of a larger number of contexts.

Although such arrangements can maintain a relatively high utilization rate, a large buffer may be needed to store the entire computation results for a particular layer of the neural network, to provide the intermediate outputs for the computations for the next layer. The required size of the buffer may further increase when a larger number of data sets are input into the array of computation units to further improve the utilization rate for higher layer computations. A larger number of memory units and the associated interfacing circuitries may be needed to implement the buffer. All these can increase the power consumption as well as chip space, which can severely limit the deployment of computing devices and applications for computations and problem-solving using neural network architectures.

Embodiments of the present disclosure relate to a method of operating a computing engine to perform computations for a multi-layer neural network for multiple contexts. In one example, the method comprises: performing, using a computing engine, a first computation task associated with a first neural network layer for a first context to generate first data; performing, using the computing engine and based on the first data, a second computation task associated with a second neural network layer for the first context to generate second data; storing the second data at a memory device; performing, using the computing engine, a third computation task associated with the first neural network layer for a second context to generate third data; performing, using the computing engine and based on the third data, a fourth computation task associated with the second neural network layer for the second context to generate fourth data; storing the fourth data at the memory device; and performing, using the computing engine and based on the second data and the fourth data stored at the memory device, a fifth computation task and a sixth computation task in parallel, the fifth computation task and the sixth computation task being associated with a third neural network layer for, respectively, the first context and the second context.

Embodiments of the present disclosure also relate to a method of scheduling the operations at a computing engine for performing multi-layer neural network computations for multiple contexts. Referring to the example above, the scheduling method may comprise determining a first execution batch comprising the fifth computation task and the sixth computation task; determining, based on the memory device having sufficient capacity to store input data and output data of the second computation task and output data of the fourth computation task, a second execution batch comprising the second computation task and a third execution batch comprising the fourth computation task, both of the second execution batch and the third execution batch to be executed before the first execution batch; and determining, based on the memory having sufficient capacity to store input data and output data of the first computation task and the output data of the fourth computation task, a fourth execution batch comprising the first computation task to be executed between the second execution batch and the third execution batch. The first, second, third, and fourth execution batches can be executed following the order determined above to perform the example method of multi-layer neural network computations for multiple contexts described above.

Compared with the aforementioned lock-step scheme, embodiments of the present disclosure can operate with a smaller buffer for storing intermediate outputs of the computations. As an illustrative example, in the lock-step scheme, the computing engine may complete the first neural network layer computations for both the first context and the second context, and then proceed to perform the second neural network layer computations for both the first context and the second context, followed by the third neural network layer computations for both the first context and the second context. The computing engine may perform the first neural network layer computations for the first context followed by the second context. To support the batch processing, the buffer needs to provide a first storage space to store the input and output of the on-going first neural network layer computations of the second context, as well as a second storage space to store the output of the completed first neural network layer computations of the first context (to be provided as input to the second neural network layer computations of the first context, after the first neural network layer computations of the second context complete).

On the other hand, with embodiments of the present disclosure, the computing engine can complete the first neural network layer computations and the second neural network layer computations for the first context, store the second neural network layer output of the first context, and then proceed to perform the first neural network layer computations for the second context. To support the first neural network layer computations for the second context, the buffer may also need to provide a first storage space for the input data and output data of the first neural network layer computations for the second context (which is identical to the first storage space needed in the illustrative example of lock-step scheme described above). The buffer also needs to provide a second storage space to store the output of the completed second neural network layer computations of the first context. The second storage space in this case can be smaller than the second storage space in the example of the lock-step scheme described above. This is because the size of the second neural network layer is typically smaller than the size of the first neural network layer, and the output data size of the second neural network layer is also typically smaller than the output data size of the first neural network layer. Therefore, a smaller buffer can be used to store the intermediate results as the computing engine progresses through the layers.

With embodiments of the present disclosure, the computations for different input data sets can be arranged to maximize the utilization of the computing resources (e.g., by allowing concurrent higher layer computations for multiple input data sets) while reducing the buffer usage. As a result, a smaller memory device can be used to support the computations, which can reduce the chip space and power consumption.

FIG. 1 illustrates an example classifier device 100 that uses techniques disclosed herein to process a data sequence. Classifier device 100 can be, for example, a computing device operating a software application 102 and a prediction model 103 to predict information included in a data sequence, and perform a pre-determined function based on the prediction. For example, classifier device 100 can be part of an image recognition service provided to identify certain objects (e.g., texts, a person, etc.) from an image. It is understood that the image recognition service is merely provided as an illustrative example, and that techniques disclosed herein can be used for other data processing applications including, for example, text-based data processing (e.g., processing of search queries), audio data processing, etc.

The image recognition service can be provided in a multi-tenant compute service system. The multi-tenant compute service system may typically include a plurality of servers that can host data and can be used by multiple clients or organizations to run instances, such as virtual machine instances or bare-metal instances (e.g., operating systems that run directly on the server hardware). In instances such as bare-metal or virtual machine, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it and decommission it when it is no longer needed, such that the resources supporting the image recognition service (e.g., access to software application 102, and the underlying hardware resources for processing software application 102) can be reallocated to other clients.

As shown in FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of pre-determined image features. As to be discussed in more detail below, software application 102 may employ prediction model 203 to compute a set of scores based on the pixel data of image 104. The set of scores may represent, for example, the likelihood of image 104 including the pre-determined image features. Software application 102 can then determine other information about the content of image 104 based on the scores. For example, based on the scores, software application 102 can determine that image 104 is an image of a panda.

Figure 2A:
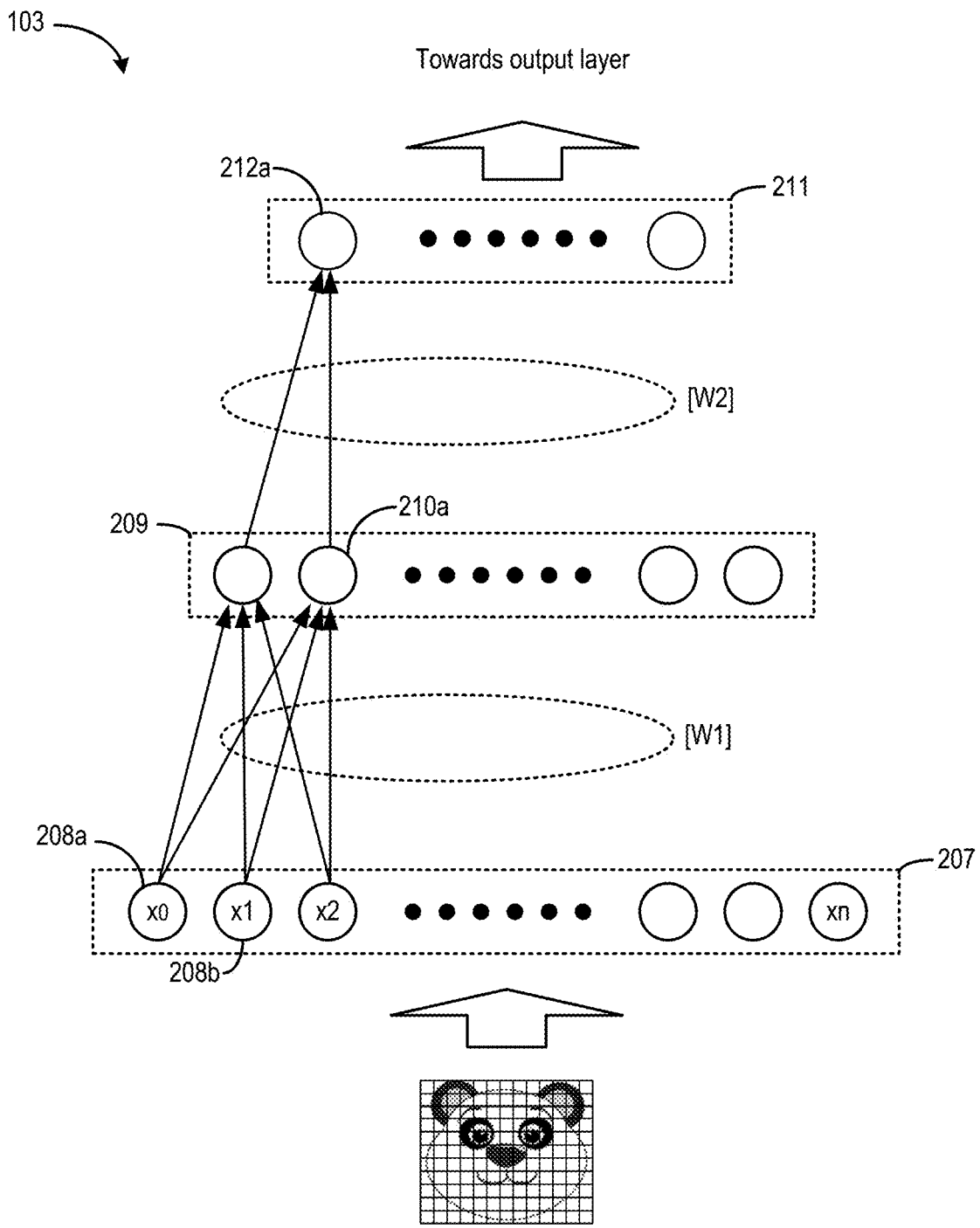
FIG. 2A, FIG. 2B, FIG. 2C, and FIG. 2D are simplified block diagrams of a prediction model that uses techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 2A illustrates an example of prediction model 103 that uses techniques disclosed herein. In the example of FIG. 2A, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A).

Layer 207 may process pixel data representing different portions of image 104. In the example of FIG. 2A, layer 207 may process the pixel data of image 104. Each processing node of layer 207 is assigned to receive a pixel value (e.g., $x_0, x_1, x_2, \ldots x_n$) corresponding to a pre-determined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \Sigma_{i=0}^{n}(W1_i \times x_i) \quad \text{(Equation 1)}$$

Here, $\text{sum}_{210a}$ represents a sum generated by processing node 210a. $W1_i \times x_i$ represents a scaling of a particular pixel value (e.g., $x_0$) with the associated weight (e.g., $W1_0$) by a processing node of layer 207. In a case where prediction model 203 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1).

Figure 2B:
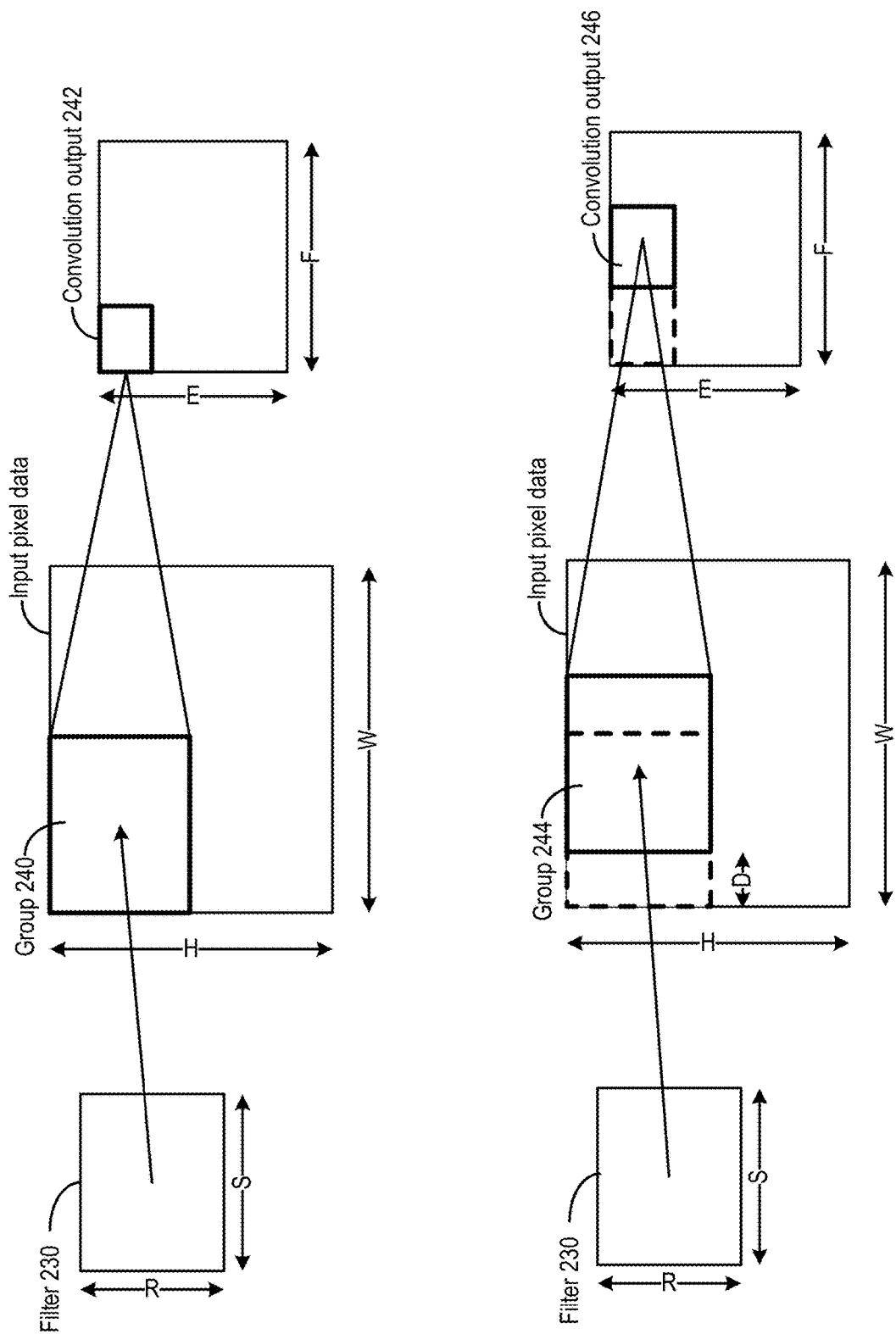

On the other hand, in a case where prediction model 103 is a CNN, each processing node of layer 209 may generate the sum based on the scaling of pixel values from a group of processing nodes of layer 207. The sum may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 246, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixels) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array 280 with a height of E rows and a width of F columns. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Figure 2C:
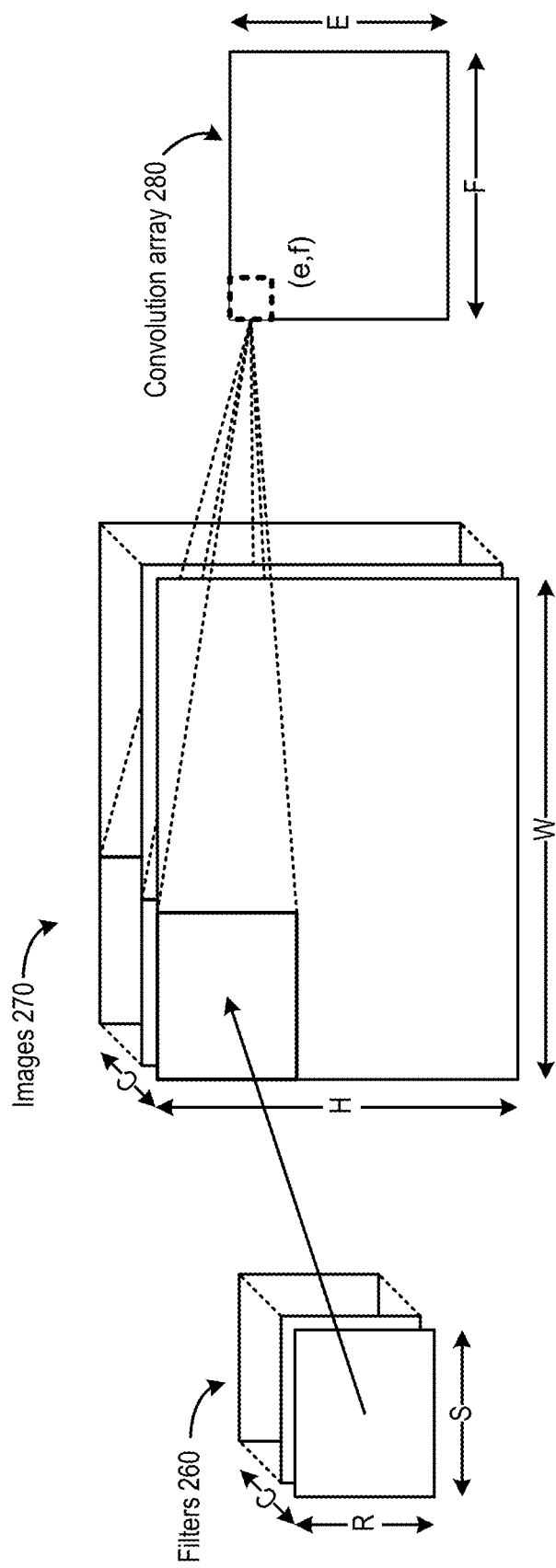

In some examples, the convolution operations can be performed between multiple images and multiple filters. For example, referring to FIG. 2C, a set of C filters 260 may correspond to a number (C) of images 270, and convolution operations can be performed between each filter of the set of filters 260 and blocks of pixels on the corresponding image of images 270. The convolution results for each filter-image pair can be summed to generate a convolution output as follows:

$$O_{e,f} = \Sigma_{r=0}^{R-1} \Sigma_{s=0}^{S-1} \Sigma_{c=0}^{C-1} X^c_{eD+r,fD+s} \times W^c_{r,s} \quad \text{(Equation 2)}$$

Here, the convolution operation involves the images (or pixel arrays). $X^c_{eD+r,fD+s}$ which may refer to the value of a pixel at an image of index c, within the number (C) of images 370, with a horizontal pixel coordinate of eD+r and a vertical pixel coordinate of fD+s. D is the sliding-window stride distance, whereas e and f correspond to the location of the output in the convolution output array, which can also correspond to a particular sliding window. Further, r and s correspond to a particular location within the sliding window. A pixel at an (r,s) location and of an image of index c can also correspond to a weight $W^c_{r,s}$ in a corresponding filter of the same index c at the same (r,s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the images within the image set can be computed and then a sum of the partial sums for all images of the image set can be computed.

Moreover, in some examples, multiple sets of filters can be used to perform convolution operations with a set of images to generate a set of convolution output arrays, with each convolution output array corresponding to a set of filters. For example, the multiple sets of filters may correspond to multiple image features to be detected from the set of images, and each convolution output array corresponds to the detection results for each image feature from the set of images. For example, where M sets of filters are applied to C images to generate M convolution output arrays, Equation 2 can be updated as follows:

$$O_{e,f}^m = \sum_{r=0}^{R-1} \sum_{s=0}^{S-1} \sum_{c=0}^{C-1} X_{eD+r, fD+s}^c \times W_{r,s}^{c,m}$$ (Equation 3)

Here, the convolution output $O_{e,f}^m$ and weight $W_{r,s}^{c,m}$ has an index m corresponding to one of the M sets of filters.

Figure 2D:
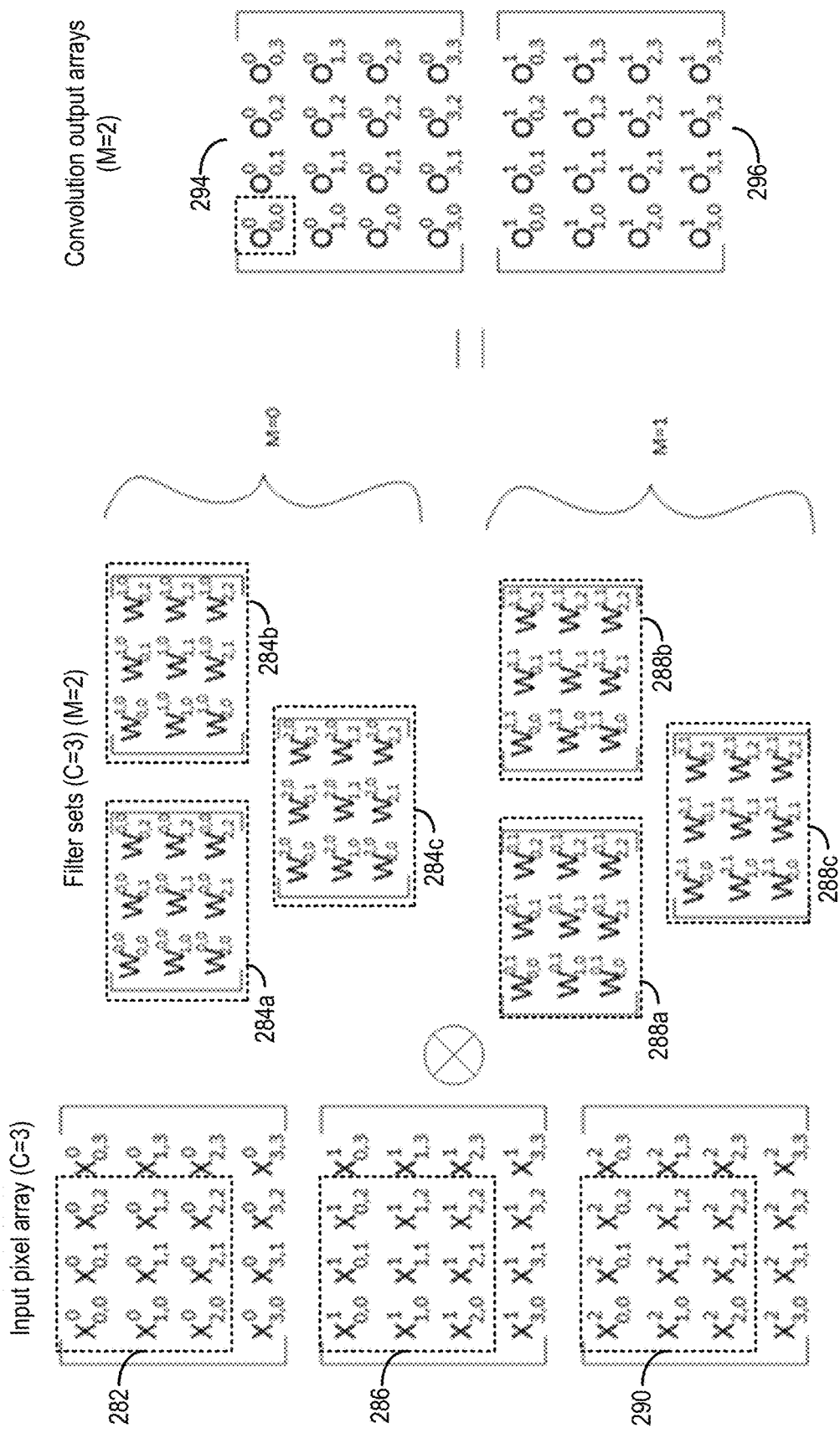

FIG. 2D illustrates an example of C sets of input data sets (with C=3) to be convolved with M sets of filters (with M=2). Each set of input data corresponds to the entries of a pixel group. For example, each of pixel groups 282, 286, and 290 may correspond to one input data set. Each of the M sets of filters includes a set of C filters which correspond to the C sets of input pixel arrays. In the example of FIG. 2D, there are two filter sets where the first filter set comprises filter arrays 284a, 284b, and 284c and the second filter set comprises filter arrays 288a, 288b, and 288c. The convolution operations generate M sets of output data sets, with each output data set corresponding to a convolution output array. In the example of FIG. 2D, two convolution output arrays 294 and 296 are generated. Each convolution output array corresponds to convolving one set (of the M sets) of filters with the input pixel arrays. For example, first element $O_{0,0}^0$ of convolution output array 294 can be generated by a sum of a dot-product between pixel group 282 and filter array 284a, a dot-product between pixel group 286 and filter array 284b, and a dot-product between pixel group 290 and filter array 284c.

Referring back to FIG. 2A, one processing node of layer 209 may be configured to generate one convolution output array, and a set M of processing nodes of layer 209 can correspond to a set M of convolution output arrays. The processing node of layer 209 can also post-process each convolution output with, for example, an activation function to generate a final output for layer 209. The activation function may translate the convolution output (or subsamples) into a decision of whether to forward the convolution output (or subsamples) to upper layers. The generation of the decision can be analogous to the firing of a biological neuron. An example of an activation function can be a rectified linear unit (ReLu) defined according to the following equation:

$$ReLu(y) = \max(0, y)$$ (Equation 4)

A processing node of layer 209 (e.g., processing node 210a) may process the convolution output subsamples with the ReLu function to generate intermediate outputs based on Equation 4. In addition, the processing node of layer 209 may also perform other post-processing operations, such as pooling operations, to reduce the number of intermediate outputs. Layer 209 can provide the post-processed intermediate outputs to layer 211, which may perform additional convolution operations based on different sets of filters. The outputs from each processing node of layer 211 may be forwarded to other higher intermediate layers, or to an output layer (not shown in FIG. 2A). The output layer may form an output vector representing, for example, a probability that a certain image feature is included in image 104 of FIG. 2A (or a set of images represented by a set of input pixel arrays of FIG. 2D), to determine whether the image or the set of images associated with a particular context include an image of a panda. For example, the output vector may be compared against a reference vector associated with a nose object of a panda, or a reference vector associated with a panda, and generate a decision based on the comparison result. Multiple instances of model 103 can be used to process multiple images (or multiple sets of images) associated with multiple contexts to generate a decision for each of the contexts.

Figure 3A:
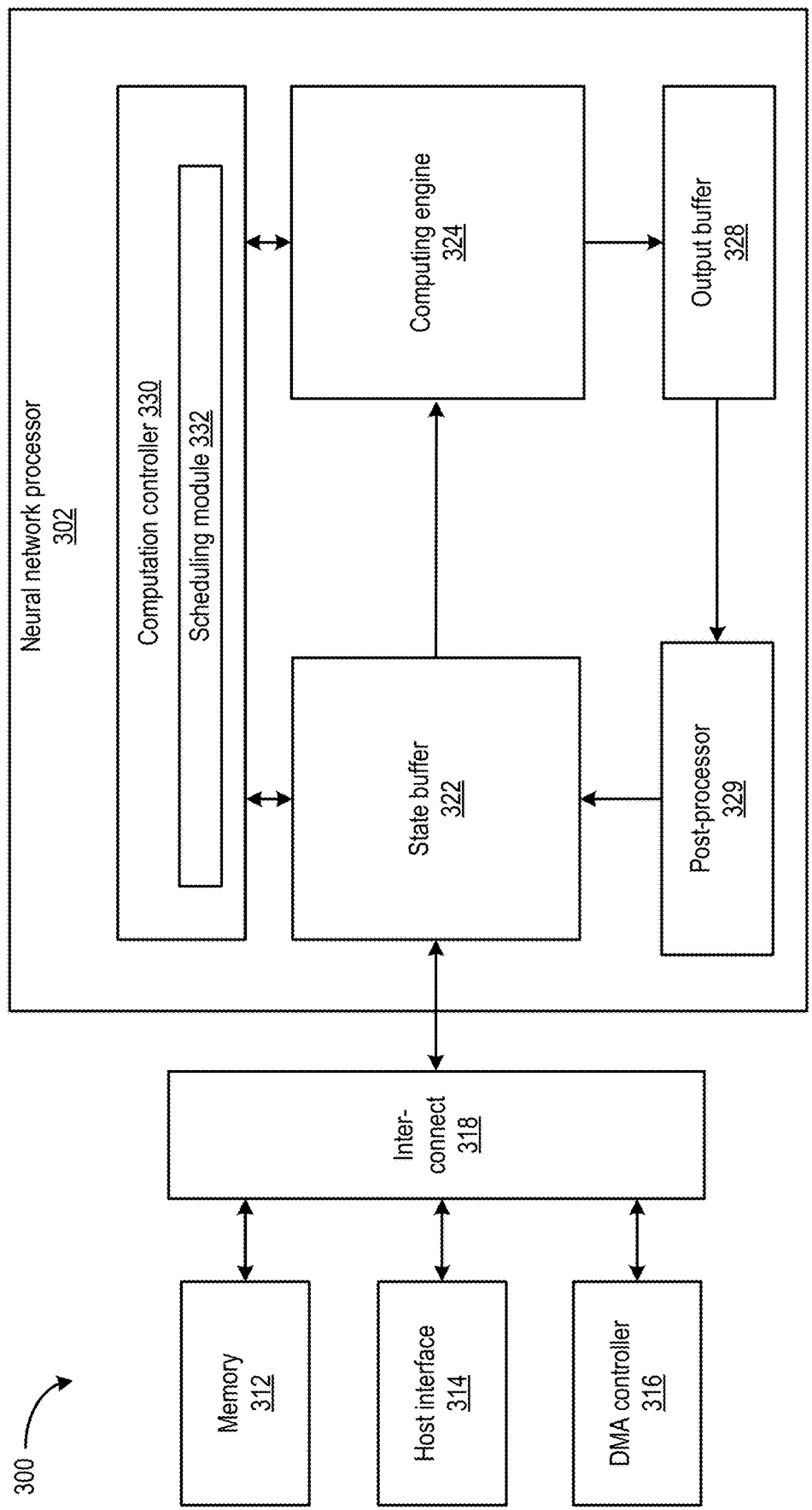
FIG. 3A, FIG. 3B, and FIG. 3C are simplified block diagrams for some of the internal components of an apparatus for implementing the prediction model of FIG. 2, according to certain aspects of the present disclosure.

FIG. 3A shows an apparatus 300 according to some embodiments of the present disclosure. Apparatus 300 may be part of a computer system, e.g., a host server. Apparatus 300 may be part of a multi-tenant compute service system and can communicate with a host device (not shown in FIG. 3A) to provide computing and memory resources for a computing service. For example, referring back to FIG. 1, apparatus 300 may provide computing and memory resources for computations with prediction model 103. A host device can operate software application 102 and communicate with apparatus 300 to perform one or more image recognition tasks based on computations with prediction model 103. The host device may transmit multiple image data sets associated with multiple contexts, and provide the multiple image data sets to apparatus 300, which can generate multiple outputs to predict, for example, whether each of the multiple image data sets includes a pre-determined object.

In the example of FIG. 3A, apparatus 300 may include a neural network processor 302 coupled to memory 312, a direct memory access (DMA) controller 316, and a host interface 314 via an interconnect 318. As to be discussed in more detail, neural network processor 302 can provide the computing resources to support the computations with prediction model 103. Memory 312 may be configured to store the instructions, input data (e.g., pixel groups 282, 286, and 290 of FIG. 2D) and the weights (e.g., filter arrays 284a, 284b, 284c, 288a, 288b, and 288c)) received from the host device. Memory 312 may also be configured to store the output of neural network processor 302 (e.g., convolution output arrays 294 and 296 of FIG. 2D). Memory 312 may include any suitable memory, e.g., dynamic random access memory (DRAM), synchronous DRAM (SDRAM), double data rate DRAM (DDR DRAM), storage class memory (SCM), flash memory devices, etc.

DMA controller 316 may be configured to perform DMA operations to transfer data between neural network processor 302 and the host device. For example, as discussed above, the host device can store the instructions, input data, and the weights at memory 312. The host device can provide the memory addresses for the stored instructions, data, and weights to neural network processor 302 (e.g., in the form of memory descriptors). Neural network processor 302 can then obtain the stored instructions, data, and weights based on the memory addresses provided by the host device. Neural network processor 302 can also store the results of computations (e.g., one or more image recognition decisions) at memory 312, and provide the memory addresses for the stored results to the host device.

Host interface 314 may be configured to enable communication between the host device and neural network processor 302. For example, host interface 314 may be configured to transmit the memory descriptors including the memory addresses of the stored data (e.g., input data, weights, results of computations, etc.) between the host device and neural network processor 302. Host interface 314 may include, for example, a peripheral component interconnect express (PCIe) interface or any suitable interface for communicating with the host device.

Neural network processor 302 can provide the computing resources to support the computations with one or more instances of prediction model 103. In the example of FIG. 3A, neural network processor 302 may include a state buffer 322, a computing engine 324, an output buffer 328, a post-processor 329, and a computation controller 330.

State buffer 322 may be configured to provide caching of data used for computations at computing engine 324. The data cached at state buffer 322 may include, for example, the input data and weights obtained from memory 312, as well as intermediate outputs of computations at computing engine 324. The caching can reduce the effect of memory access bottleneck (e.g., caused by the latencies at memory 312, DMA controller 316, interconnect 318, etc.) on the performance of computing engine 324. State buffer 322 can be controlled by computation controller 330 to pre-fetch a set of weights to computing engine 324, and then fetch the input data as a sequential stream to computing engine 324, which performs the computations and generates a sequential stream of intermediate output data. The stream of intermediate output data can be collected at output buffer 328 and post-processed by post-processor 329. The post-processed stream of intermediate output data can be stored at state buffer 322. The intermediate output data can be stored at a different location in state buffer 322 from where the input data and weights are stored to avoid overwriting, for example, input data that are yet to be fetched to computing engine 324. State buffer 322 can be an on-chip memory device and may include, for example, static random access memory (SRAM).

Computing engine 324 may include a set of circuitries configured to perform one or more arithmetic operations involved in neural network computations. For example, computing engine 324 may include a set of multipliers to perform the scaling of input data with associated weights, and a set of adders to generate a sum of the results of multiplications representing dot-products and convolution results, as discussed above. Computing engine 324 may obtain the weights used for the scaling from state buffer 322. As to be discussed in more detail below, computing engine 324 may obtain the inputs to be scaled from state buffer 322, or from output buffer 328.

In some examples, computing engine 324 may be controlled (e.g., by computation controller 330) to perform computations for different neural network layers sequentially, to reduce the sizes of the weights stored in state buffer 322. For example, computing engine 324 may be controlled to perform the arithmetic operations for one neural network layer (e.g., layer 207) within one time period, and then to perform the arithmetic operations for the next neural network layer (e.g., layer 209) in the next time period. With such arrangements, state buffer 322 may pre-fetch and cache a set of weights for one neural network layer, instead of caching multiple sets of weights for multiple neural network layers, to support the arithmetic operations at computing engine 324. As a result, the required size for state buffer 322 can be reduced, and the chip size as well as the power consumption of neural network processor 302 can also be reduced. On the other hand, as described above, state buffer 322 needs to provide storage space for both the input data (and the weights) and the output data for computations of at least one neural network layer computation for one context (e.g., an image, a set of images, audio data, or other data associated with a context) to avoid overwriting the input data with the output data for the computations.

Figure 3B:
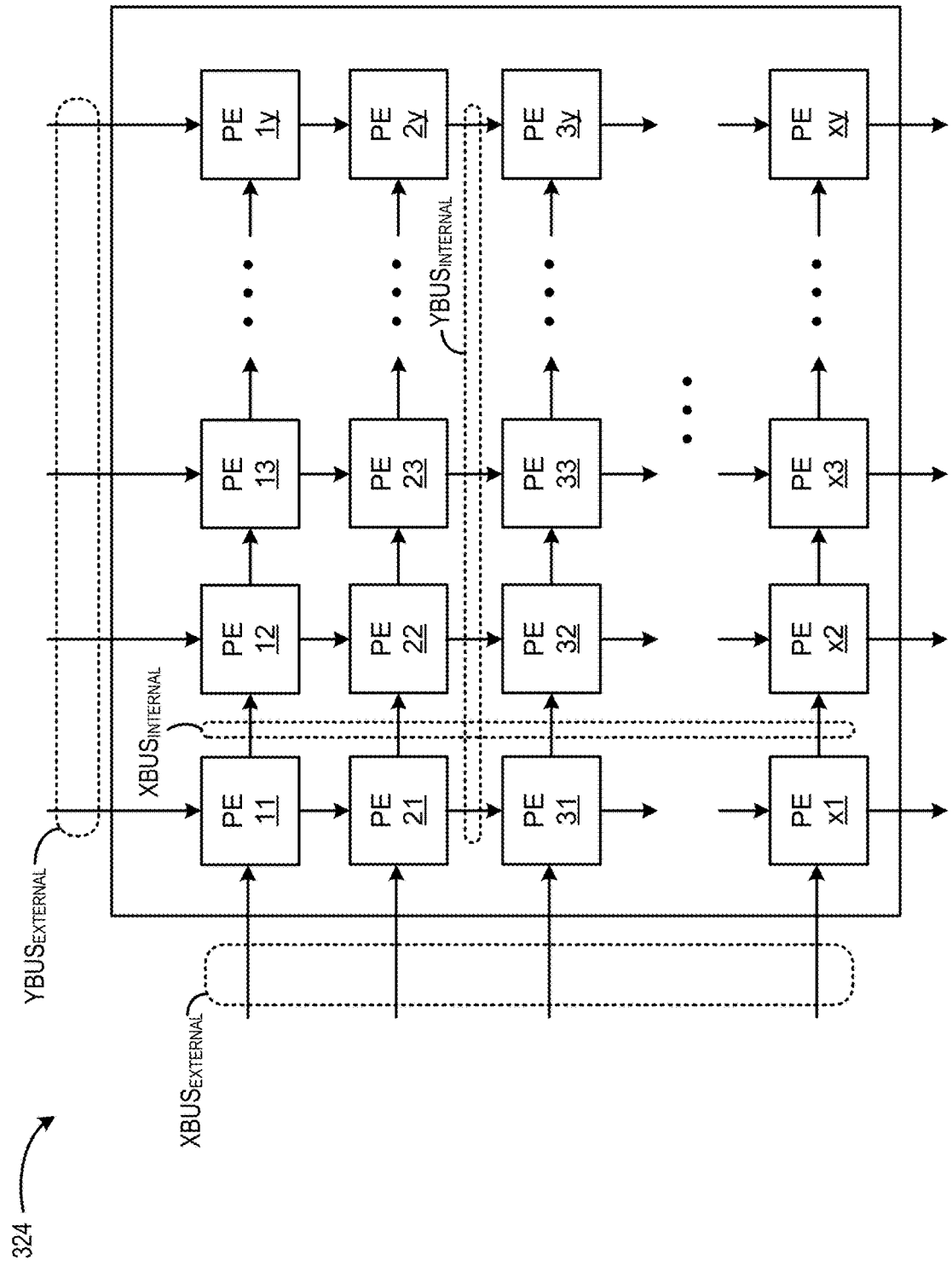

FIG. 3B illustrates an example of an internal structure of computing engine 324. Computing engine 324 may include an array of processing elements (PE) arranged in multiple rows and columns. PEs within one row are connected with each other via internal row buses XBUSINTERNAL, whereas each of PEs 11, 21, 31, . . . x1 is connected to external circuitries via an external row bus $XBUS_{EXTERNAL}$. Moreover, PEs within one column are connected with each other via internal column buses $YBUS_{INTERNAL}$, each of PEs 11, 12, 13, . . . 1y is connected to external circuitries via an external column bus $YBUS_{EXTERNAL}$. As to be discussed in more detail below, external row bus $XBUS_{EXTERNAL}$ and external column bus $YBUS_{EXTERNAL}$ are configurable to provide data to the PE arrays from, for example, state buffer 322 and output buffer 328 to scale the computation operations for a particular neural network layer.

In some configurations, each column of PEs may perform the scaling and summation computations for one processing node of prediction model 103 (e.g., one of processing nodes 208a, 210a, 212a, etc.), whereas each row of PEs may perform the scaling and summation computations for one input data set. As an illustrative example, for performing the computations for layer 209, each of PEs 11, 12, 13, . . . 1y of a first row may receive a pixel value of pixel group 282 of FIG. 2D from $XBUS_{EXTERNAL}$. Also, each of PEs 11, 21, 31, . . . x1 of a first column may receive an element of filter sets 284a, 284b, and 284c to generate an output of convolution output array 294 of FIG. 2D. Moreover, each of PEs 21, 22, 23, . . . 2y of a second row may receive a pixel value of pixel group 286 of FIG. 2D from $XBUS_{EXTERNAL}$, whereas each of PEs 12, 22, 32, . . . x2 of a second column may receive an element of filter sets 288a, 288b, and 288c to generate an output of convolution output array 296 of FIG. 2D. Each of the PEs includes a multiplier to perform a multiplication function between the received pixel value and the received weight to generate a multiplication result. Moreover, each of the PEs also includes an adder to accumulate the multiplication results within one column of the PEs. For example, PE 11 generates a first multiplication result based on a first pixel value and a first weight, and passes the first multiplication result to PE 21 via a YBUS. PE21 generates a second multiplication result based on a second pixel value and a second weight based on a second pixel value and a second weight, adds the second multiplication result to generate a partial sum, and passes the partial sum to PE 31 via another YBUS. The other PEs within the same column as PEs 11, 21, and 31 also performs the multiplications and accumulations. PE x1 can then generate convolution output 242, and transmit the convolution output via $YBUS_{EXTERNAL}$.

In some configurations, the PEs of computing engine 324 can be used to implement multiple instances of prediction model 103. For example, when processing higher level layers with a smaller number of processing nodes and a smaller number of input data, the PEs of the same row can be used to process input data sets of different contexts (e.g., corresponding to different images or different sets of images captured at different locations, times, by different people, or otherwise carrying different information). For example, PE 11 may be configured to process one input data set of a first context, whereas PE 12 may be configured to process another input data set of a second context. Both PE 11 and PE 12 may store the same set of weights and apply the same set of weights to the input data. The first column (comprising PEs 11, 21, . . . x1) may be configured to process multiple input data sets of the first context, whereas the second column (comprising PEs 12, 22, . . . x2) may be configured to process multiple input data sets of the second context.

Figure 3C:
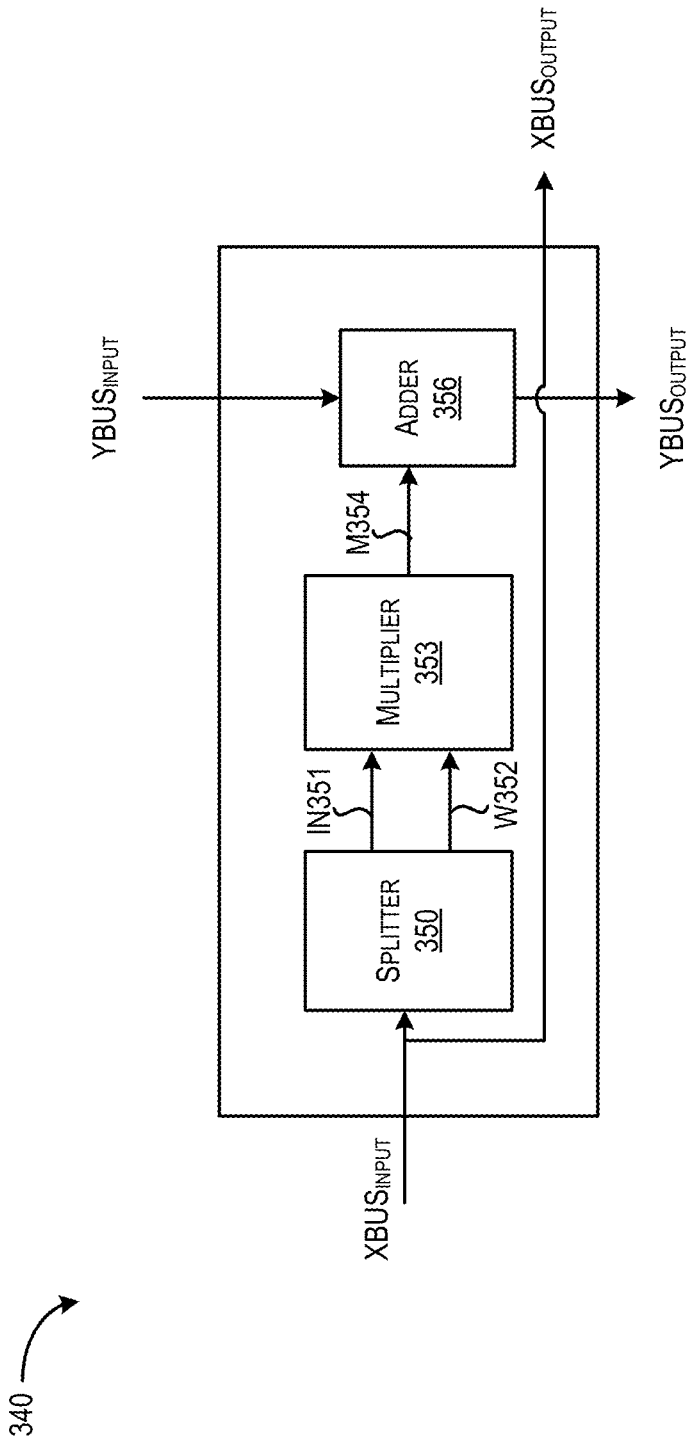

FIG. 3C illustrates an example of an internal structure of a PE 340, which can be any one of the PEs described in FIG. 3B. PE 340 may include a splitter 350, a multiplier 353, and an adder 356. Splitter 350 may receive a set of data from an input XBUS (e.g., $XBUS_{INPUT}$) and extract the input values and weights. For example, PE 11 may receive, from $XBUS_{IN}$, a set of input values and weights not just for PE 11 but also for other PEs of the same row. Splitter 350 of PE 11 can extract an input value (e.g., IN351) and a weight value (e.g., W352) targeted at PE 11 from the data on $XBUS_{IN}$, and provide the extracted values to multiplier 353 to generate a multiplication result (e.g., M354). Adder 356 can add a partial sum received from a prior PE within the same column via an input YBUS (e.g., $YBUS_{INPUT}$) to the multiplication result (e.g., M354) to generate a partial sum, and transmit the partial sum to the next PE within the same column via an output YBUS (e.g., $YBUS_{OUTPUT}$). The PE may also forward the data of $XBUS_{IN}$, via an output XBUS ($XBUS_{OUTPUT}$), to the next PE within the same row.

Referring back to FIG. 3A, neural network processor 302 further includes an output buffer 328 and a post-processor 329. Output buffer 328 includes a set of registers to store the output of computing engine 324. Post-processor 329 may include circuits (e.g., multiplexer circuits configured as mapping tables) to apply one or more activation functions (e.g., ReLu function) on the output of computing engine 324. Post-processor 329 may also include circuits to perform pooling operation to reduce the size of the outputs. Post-processor 329 can store the post-processed outputs at state buffer 322.

Computation controller 330 can determine the input data and weights provided to computing engine 324 via $XBUS_{EXTERNAL}$ and $YBUS_{EXTERNAL}$, to control the computations at computing engine 324. For example, computation controller 330 can control computing engine 324 to perform computations for each neural network layer sequentially by providing, at different times, the input data and weights associated with each neural network layer. As an illustrative example, as a first step, computation controller 330 can acquire the input pixel data and the weights associated with the scaling operations at layer 209, and feed the input pixel data and the weights via $XBUS_{EXTERNAL}$ to computing engine 324. Computing engine 324 may then generate the outputs and feed the outputs to activation engine 326 via $YBUS_{EXTERNAL}$ to generate a set of intermediate outputs (e.g., first_intermediate_output$_{210a}$) corresponding to each processing node of layer 209. The intermediate outputs can be stored at output buffer 328. If the subsequent computations are for the same input data set at the next layer (e.g., layer 211), computation controller 330 can acquire the intermediate outputs stored at output buffer 328 and feed the intermediate outputs, as well as a new set of weights from state buffer 322, to computing engine 324 via $XBUS_{EXTERNAL}$ to start the computations at layer 211. On the other hand, if intermediate outputs are not used for the subsequent computations, computation controller 330 can store the intermediate outputs at state buffer 322. The process can be repeated for each layer until the computations at the output layer complete. The sequence of the computations can be determined by a scheduler module 332 that operates a scheduling scheme to be described below.

As discussed above, in DNN and CNN, the sizes of the higher level intermediate layers typically are smaller than the sizes of the lower level intermediate layers. Therefore, as the neural network computations progress up through the neural network layers towards the output layer, the computation resources used for the computations for a layer may reduce with time. Referring to the example of FIG. 3B, layer 209 may include the same number of processing nodes as the number of PE columns in computing engine 324. Therefore, when performing computations for layer 209, every column in computing engine 324 is involved in the computations, with each column of PEs generating an output corresponding to one processing node of layer 209. However, if layer 211 has only half of the processing nodes of layer 209, half of the columns of PEs may be not needed for the computations and may be idle, leading to poor utilization of computing engine 324. To improve the utilization of computing engine 324, computation controller 330 can control computing engine 324 to process multiple input data sets (e.g., multiple images or other contexts.) and to generate multiple outputs for the multiple input data sets, as described above.

Figure 4:
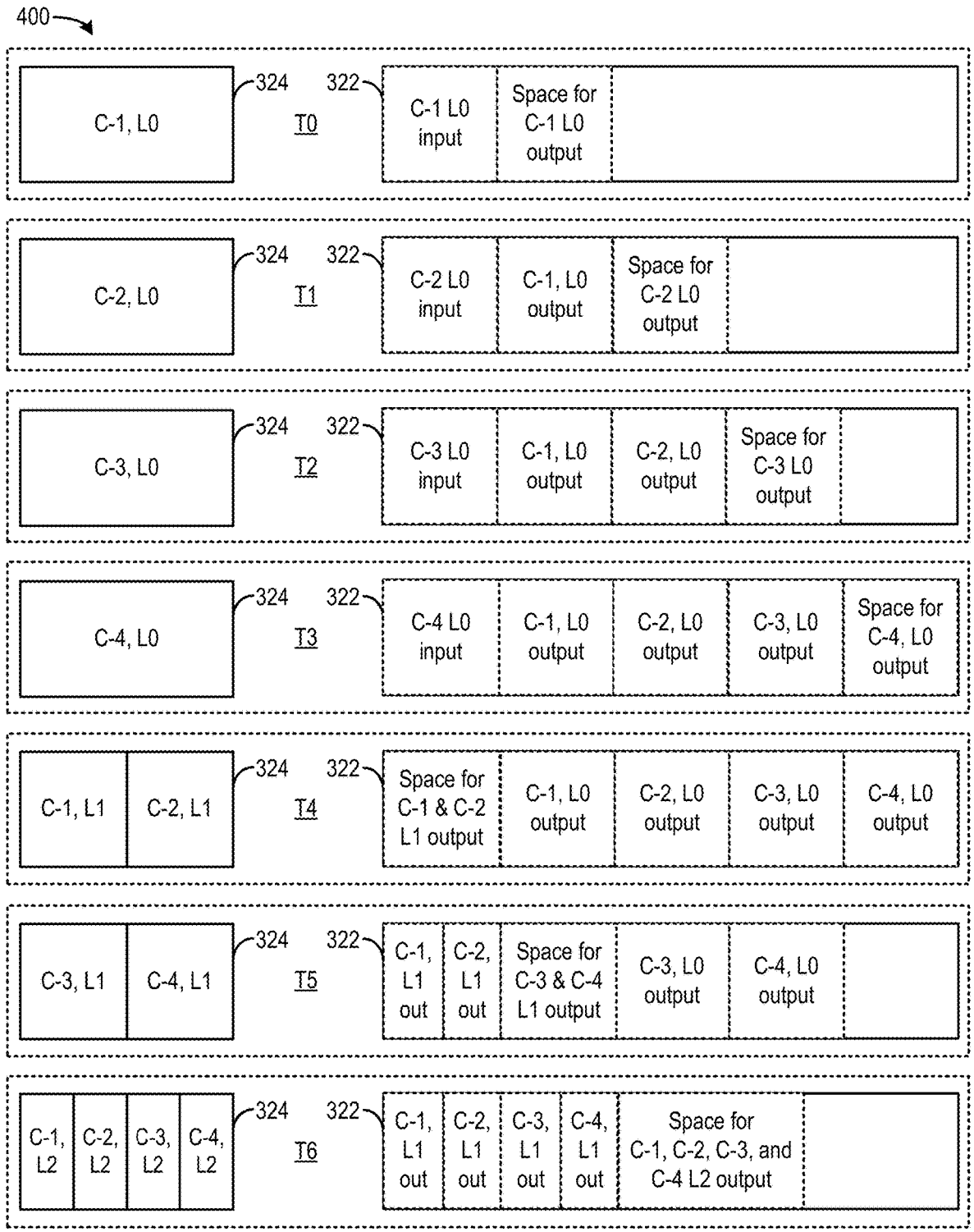
FIG. 4 and FIG. 5 illustrate example sequences of operating a computing system to perform multi-layer neural network processing of multiple sets of data, according to certain aspects of the present disclosure.

Reference is now made to FIG. 4, which illustrates an example of a sequence 400 of operating computing engine 324 to process multiple input data sets. The blocks on the left illustrate a sequence of computations at computing engine 324, whereas the blocks on the right illustrate a corresponding sequence of intermediate outputs stored at state buffer 322. The storage of the weights at state buffer 322 is not shown in FIG. 4.

In some examples, sequence 400 can be performed to operate computing engine 324 in a lock-step manner. For example, computations for lower level neural network layers can be performed sequentially (when the computation resource requirement is substantial and the computing engine 324 is fully utilized) for each input data set. After the computations for one neural network layer for all input data sets (of different contexts) complete, computing engine 324 then performs the computations for the next neural network layer. Once the computations reach a higher level neural network layer where the computation resource requirement has been reduced, computation controller 330 can perform the parallel computations for the input data sets to maintain the utilization rate of computing engine 324. As described herein and depicted in the figures, "C-1" may refer to a first context, "C-2" may refer to a second context, "C-3" may refer to a third context, and "C-4" may refer to a fourth context.

At T0, computation controller 330 can control computing engine 324 to perform L0 neural network layer (e.g., layer 209) computations for C-1, which causes computing engine 324 to be fully utilized. At T0, state buffer 322 needs to provide storage space to store the input data (and weights) for C-1 L0 computations as well as the output data of C-1 L0 computations.

At T1, after the L0 neural network layer computations complete for C-1, computation controller 330 can store the output data of the L0 computations for C-1 in state buffer 322, and then control computing engine 324 to perform the L0 neural network layer computations for C-2. At T1, state buffer 322 needs to provide storage space to store the input data and output data of the on-going L0 computations for C-2 as well as the output data of the completed L0 computations for C-1.

At T2, computation controller 330 can control computing engine 324 to perform the L0 neural network layer computations for C-3. At T2, state buffer 322 needs to provide storage space to store the input data and output data of the on-going L0 computations for C-3 as well as the output data of the completed L0 computations for C-1 and C-2.

At T3, computation controller 330 can control computing engine 324 to perform the L0 neural network layer computations for C-4. At T3, state buffer 322 needs to provide storage space to store the input data and output data of the on-going L0 computations for C-4 as well as the output data of the completed L0 computations for C-1, C-2, and C-3.

At T4, computation controller 330 can switch computing engine 324 to perform a L1 neural network layer computation (e.g., layer 211). Computation controller 330 can control computing engine 324 to perform the L1 computations for C-1 and C-2 in parallel. At T4, state buffer 322 needs to provide storage space to store the output data of the on-going L1 computations for C-1 and C-2 as well as the output data of the completed L0 computations for C-1, C-2, C-3, and C-4. The total size of data stored at T4 can be at the maximum compared with other stages of sequence 400.

At T5, computation controller 330 can control computing engine 324 to perform the L1 computations for C-3 and C-4. At T5, state buffer 322 needs to provide storage space to store the output data of the on-going L1 computations for C-3 and C-4 as well as the output data of the completed L0 computations for C-3 and C-4. The output data of the completed L0 computations for C-1 and C-2 can be removed (or overwritten by the output data of the L1 computations for C-3 and C-4) since the L1 computations for C-1 and C-2 have completed at T5 and those output data are not needed.

At T6, computation controller 330 can switch computing engine 324 to perform a L2 neural network layer computations (e.g., an output layer). Computation controller 330 can control computing engine 324 to perform the L2 computations for C-1, C-2, C-3, and C-4 in parallel. At T6, state buffer 322 needs to provide storage space to store the output data of the on-going L2 computations for C-1, C-2, C-3, and C-4 as well as the input data for these computations (e.g., output data of L1 computations for C-1, C-2, C-3, and C-4).

Although the sequence of operations in FIG. 4 allows computing engine 324 to be maintained at full capacity, a large state buffer 322 is needed to store the outputs of lower level neural network (e.g., L0) computations for multiple contexts, such as at time T4. Those intermediate outputs are typically large in size and require a substantial amount of on-chip memory spaces for storage.

Figure 5:
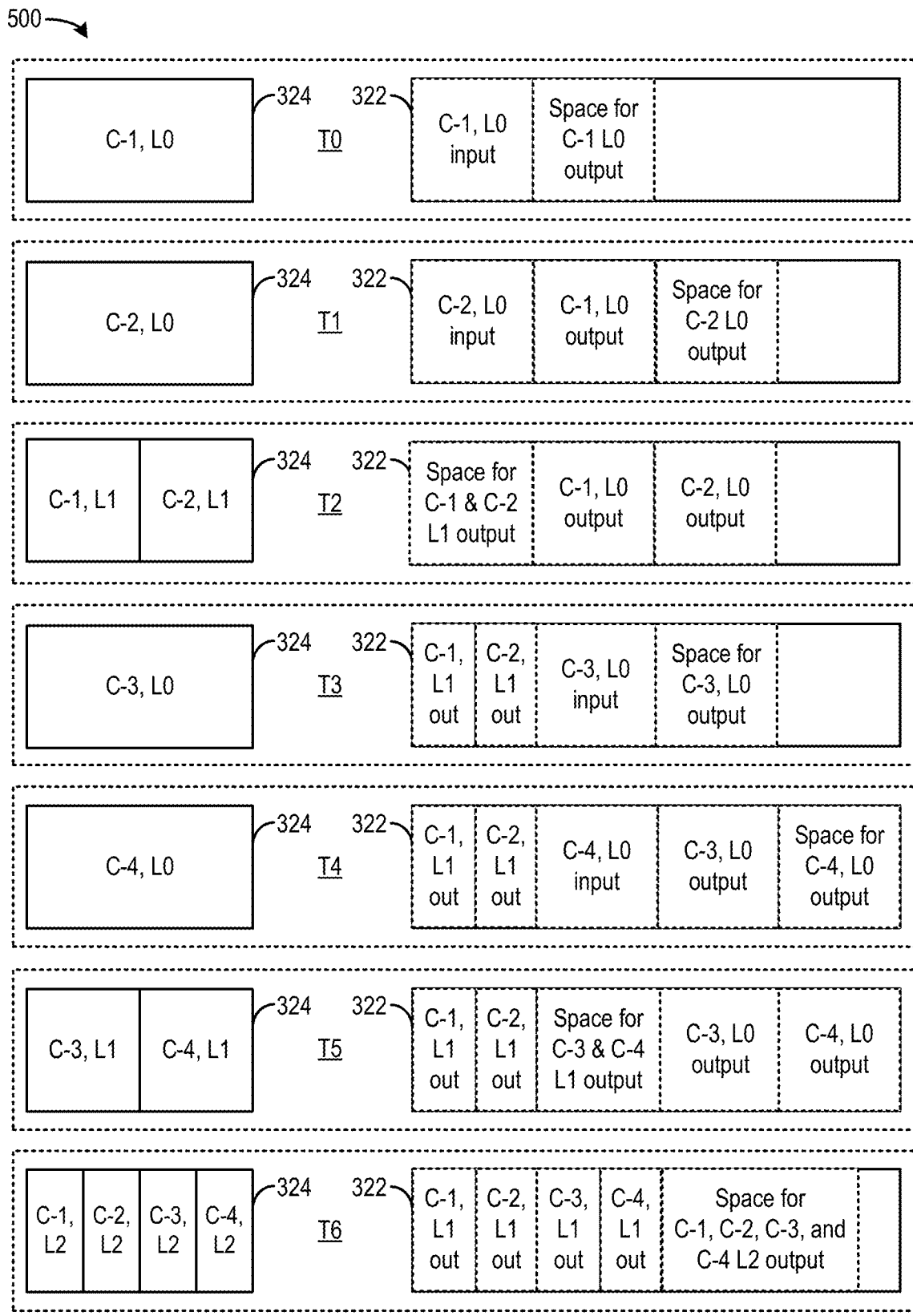

Reference is now made to FIG. 5, which illustrates an example of a sequence 500 of operating computing engine 324 to process multiple input data sets. Sequence 500 can be performed to operate computing engine 324 in a non-lock-step manner. The blocks on the left illustrate a sequence of computations at computing engine 324, whereas the blocks on the right illustrate a corresponding sequence of intermediate outputs stored at state buffer 322. The storage of the weights at state buffer 322 is not shown in FIG. 5.

At T0, computation controller 330 can control computing engine 324 to perform an L0 neural network layer (e.g., layer 209) computation for C-1, which causes computing engine 324 to be fully utilized. At T0, state buffer 322 needs to provide storage space to store the input data (and weights) for C-1 L0 computations as well as the output data of C-1 L0 computations.

At T1, after the L0 neural network layer computations complete for C-1, computation controller 330 can store the output data of the L0 computations for C-1 in state buffer 322, and then control computing engine 324 to perform the L0 neural network layer computations for C-2. At T1, state buffer 322 needs to provide storage space to store the input data and output data of the on-going L0 computations for C-2 as well as the output data of the completed L0 computations for C-1.

At T2, computation controller 330 can switch computing engine 324 to perform an L1 neural network layer computation (e.g., layer 211) for C-1 and C-2. At T2, state buffer 322 needs to provide storage space to store the input data for the on-going L1 computations (e.g., the output data of L0 computations for C-1 and C-2) as well as the output data generated by the L1 computations.

At T3, computation controller 330 can switch computing engine 324 back to perform the L0 neural network layer computations for C-3. At T3, state buffer 322 needs to provide storage space to store the output data of the completed L1 computations for C-1 and C-2, as well as the input data and output data for the on-going L0 computations for C-3.

At T4, computation controller 330 can control computing engine 324 to perform the L0 neural network layer computations for C-4. At T4, state buffer 322 needs to provide storage space to store the output data of the completed L1 computations for C-1 and C-2, the output data of the completed L0 computation for C-3, as well as the input data and output data for the on-going L0 computations for C-4. Compared with T4 of sequence 400, by storing the L0 output data (which are typically larger than higher neural network layers) for fewer contexts, the required size of state buffer 322 can be reduced.

At T5, computation controller 330 can control switch computing engine 324 to perform the L1 neural network layer computations for C-3 and C-4 in parallel. At T5, state buffer 322 needs to provide storage space to store the output data of the completed L1 computations for C-1 and C-2, as well as the input data and output data for the on-going L1 computations for C-3 and C-4. The input data for the on-going L1 computations for C-3 and C-4 include the output data of the completed L0 computations for C-3 and C-4.

At T6, computation controller 330 can switch computing engine 324 to perform an L2 neural network layer computation (e.g., an output layer). Computation controller 330 can control computing engine 324 to perform the L2 computations for C-1, C-2, C-3, and C-4 in parallel. At T6, state buffer 322 needs to provide storage space to store the output data of the on-going L2 computations for C-1, C-2, C-3, and C-4 as well as the input data for these computations (e.g., output data of L1 computations for C-1, C-2, C-3, and C-4).

Figure 6:
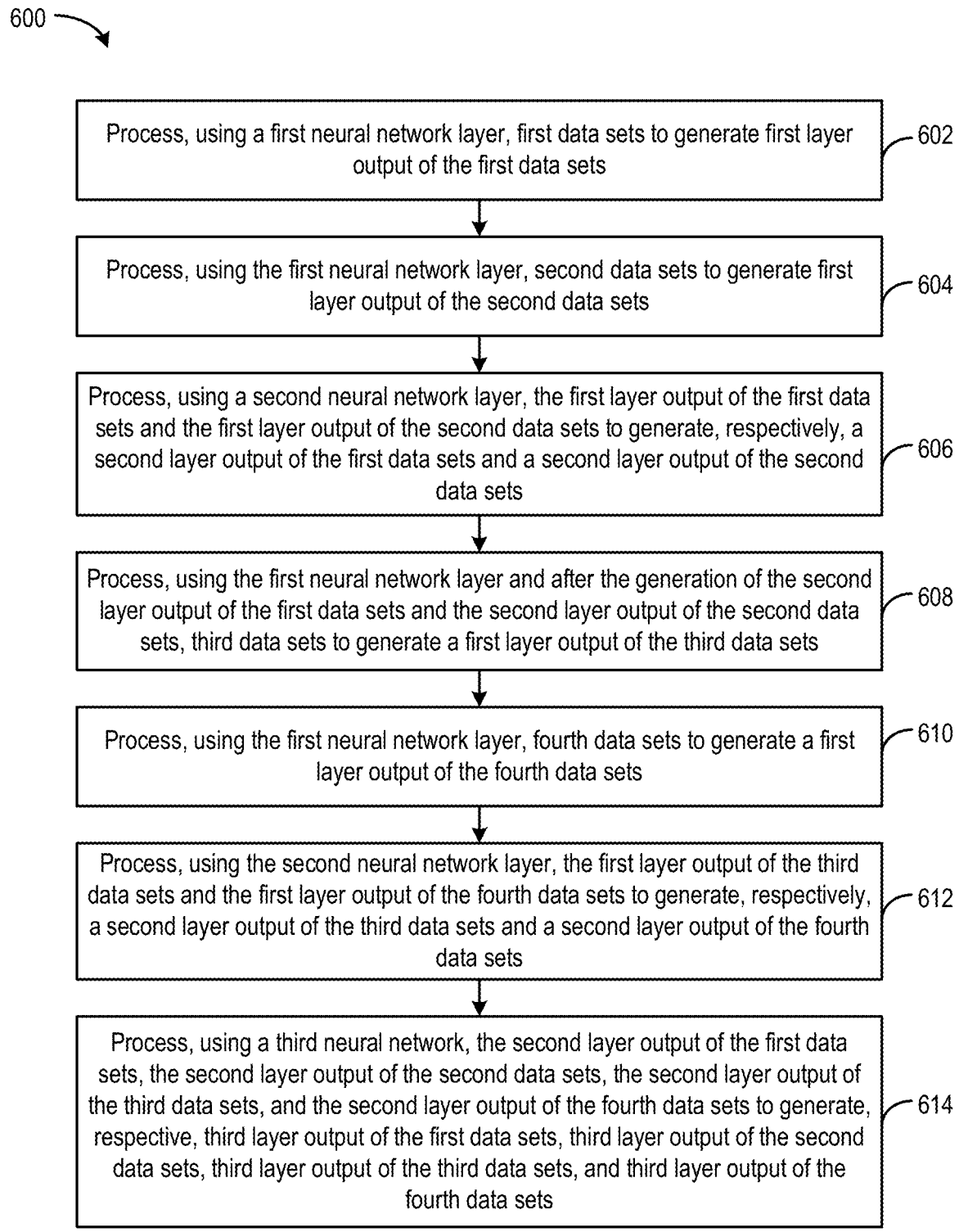
FIG. 6 illustrates an example flowchart of a method of operating a computing system to perform multi-layer neural network processing of multiple sets of data, according to certain aspects of the present disclosure.

FIG. 6 illustrates an example flow diagram of a process 600 for processing a plurality of data sets associated with different contexts in a multi-layer neural network, according to certain aspects of the present disclosure. The multi-layer neural network may include a first neural network layer (e.g., layer 209), a second neural network layer that depends on the first neural network layer (e.g., layer 211), and a third neural network layer that depends on the second neural network layer (e.g., an output layer). The process may be implemented by various systems described above, such as, for example, computation controller 330 and computing engine 324.

At operation 602, a computing engine (e.g., computing engine 324) is configured as the first neural network layer and can process first data sets (e.g., of a first context) to generate first layer output of the first data sets.

At operation 604, the computing engine, while configured as the first neural network layer, can process second data sets (e.g., of a second context) to generate a first layer output of the second data sets.

At operation 606, the computing engine is configured as the second neural network layer and can process the first layer output of the first data sets and the first layer output of the second data sets to generate, respectively, a second layer output of the first data sets (of the first context) and a second layer output of the second data sets (of the second context).

At operation 608, the computing engine is configured back to be the first neural network layer after the generation of the second layer output of the first data sets and the second layer output of the second data sets at operation 606, and the computing engine can process third data sets (e.g., of a third context) to generate a first layer output of the third data sets.

At operation 610, the computing engine, while configured as the first neural network layer, can process fourth data sets (e.g., of a fourth context) to generate a first layer output of the fourth data sets.

At operation 612, the computing engine can be configured as the second neural network and can process the first layer output of the third data sets (of the third context) and the first layer output of the fourth data sets (of the fourth context) to generate, respectively, a second layer output of the third data sets and a second layer output of the fourth data sets.

At operation 614, the computing engine can be configured as the third neural network and can process the second layer output of the first data sets (of the first context), the second layer output of the second data sets (of the second context), the second layer output of the third data sets (of the third context), and the second layer output of the fourth data sets (of the fourth context) to generate, respectively, a third layer output of the first data sets, a third layer output of the second data sets, a third layer output of the third data sets, and a third layer output of the fourth data sets.

In some examples, the re-arrangement of the order of the computations from the lock-step sequence (e.g., of FIG. 4) to a non-lock-step sequence (e.g., of FIG. 5) may be based on a scheduling scheme. The scheduling scheme can be used to determine a sequence of execution batches, with each execution batch comprising one or more computation tasks for a neural network layer to perform at computing engine 324 in parallel. Each computation task can be performed for a context, and each of the execution batches is executed at different times. The objective of the scheduling scheme can be to maximize each execution batch size (e.g., a number of parallel computation tasks to performed) under the constraint of available space at state buffer 322 as well as interlayer data dependency.

In some examples, scheduler module 332 of computation controller 330 can apply a graph reduction scheme to determine a graph of dependencies among the computations of different neural network layers for different contexts. Scheduler module 332 can then traverse the graph starting from the higher neural network layer computations and determine a sequence of the computation tasks. The determination can be based on how many parallel computation tasks can be supported by the state buffer, and the inter-layer data dependency. As discussed above, to support parallel execution of a number of computation tasks of a neural network layer, the state buffer needs to have sufficient capacity to store both the input data and the output data of the number of computation tasks. After determining a first execution batch size for a first neural network layer (e.g., layer 211 of FIG. 2A), scheduler module 332 can traverse the dependency graph and determine whether the state buffer can support the number of computation tasks for a second neural network layer (e.g., layer 209 of FIG. 2A) which provides the input data for the first neural network layer. If the state buffer cannot support the number of computation tasks for the second neural network layer, the scheduler can split the number of computation tasks for the second neural network layer into multiple execution batches. The determination of the multiple execution batches can be to maximize a number of parallel computation tasks for the second neural network layer in each execution batch under the constraint that the state buffer has sufficient capacity to store the output data of earlier execution batches as well as the input and output data of an on-going execution batch. After determining the execution batches for the second neural network layer, the scheduler can traverse the dependency graph to determine the computations tasks for a third neural network (e.g., layer 207 of FIG. 2A) which provides the input data for the second neural network layer, and repeats the execution batch to determination operations under the constraint of state buffer capacity as described above.

Figure 7A:
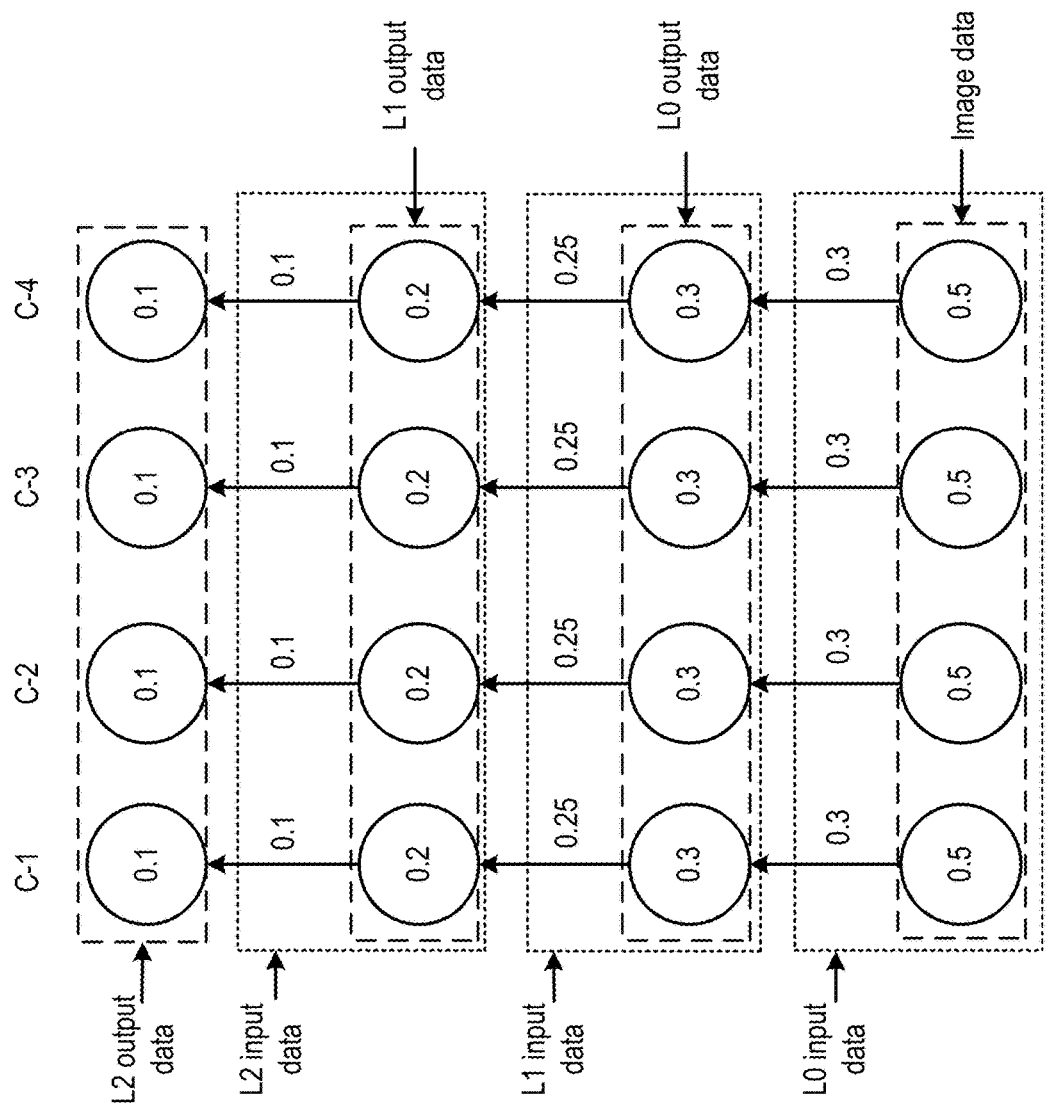
FIG. 7A, FIG. 7B, FIG. 7C, FIG. 7D, FIG. 7E, FIG. 7F, and FIG. 7G illustrate an example of a scheduling scheme to schedule multi-layer neural network processing of multiple sets of data, according to certain aspects of the present disclosure.

Reference is now made to FIG. 7A-FIG. 7G, which illustrate an example of scheduling schemes. FIG. 7A illustrates examples of dependency graphs of neural network layer computations for contexts C-1, C-2, C-3, and C-4 of FIG. 4 and FIG. 5. In this example, it can be assumed that computing engine 324 poses no constraint on how many computation tasks can be executed concurrently, and the only constraints come from the inter-layer dependency and the capacity of state buffer. In this illustrative example, the size of the state buffer can be 2 units.

In the example of FIG. 7A, each bubble (i.e., circle) can correspond to a computation task of a neural network layer or an external input for a context, and the number in the bubble indicates a size of the output data to be generated by the computation task, or a size of the external input data. The size of the output data (or external input data) is relative to the size of the state buffer, and both have the same units. Each execution batch can include one or more of the bubbles of the same neural network layer. Pairs bubbles are linked by a respective arrow of which the direction indicates a data dependency. The number adjacent to the arrow can indicate a size of a weight value used for a computation task of a neural network layer. The weight values can be shared among the bubbles in one execution batch. Referring to the dependency graph of context C-1, a L0 (neural network layer 0) computation task can receive, as input data, image data of a size of 0.5 units as external input and a weight of a size of 0.3 units. The L0 computation task can generate output data of a size of 0.3 units. A L1 (neural network layer 1) computation task can receive, as input data, the output data of the L0 computation task (of a size of 0.3 units) and a weight of a size of 0.25 units. Further, A L2 (neural network layer 2) computation task can receive, as input data, the output data of the L1 computation task (of a size of 0.2 units) and a weight of a size of 0.1 units. Moreover, the L2 computation task can generate output data of a size of 0.1 units.

Figure 7B:
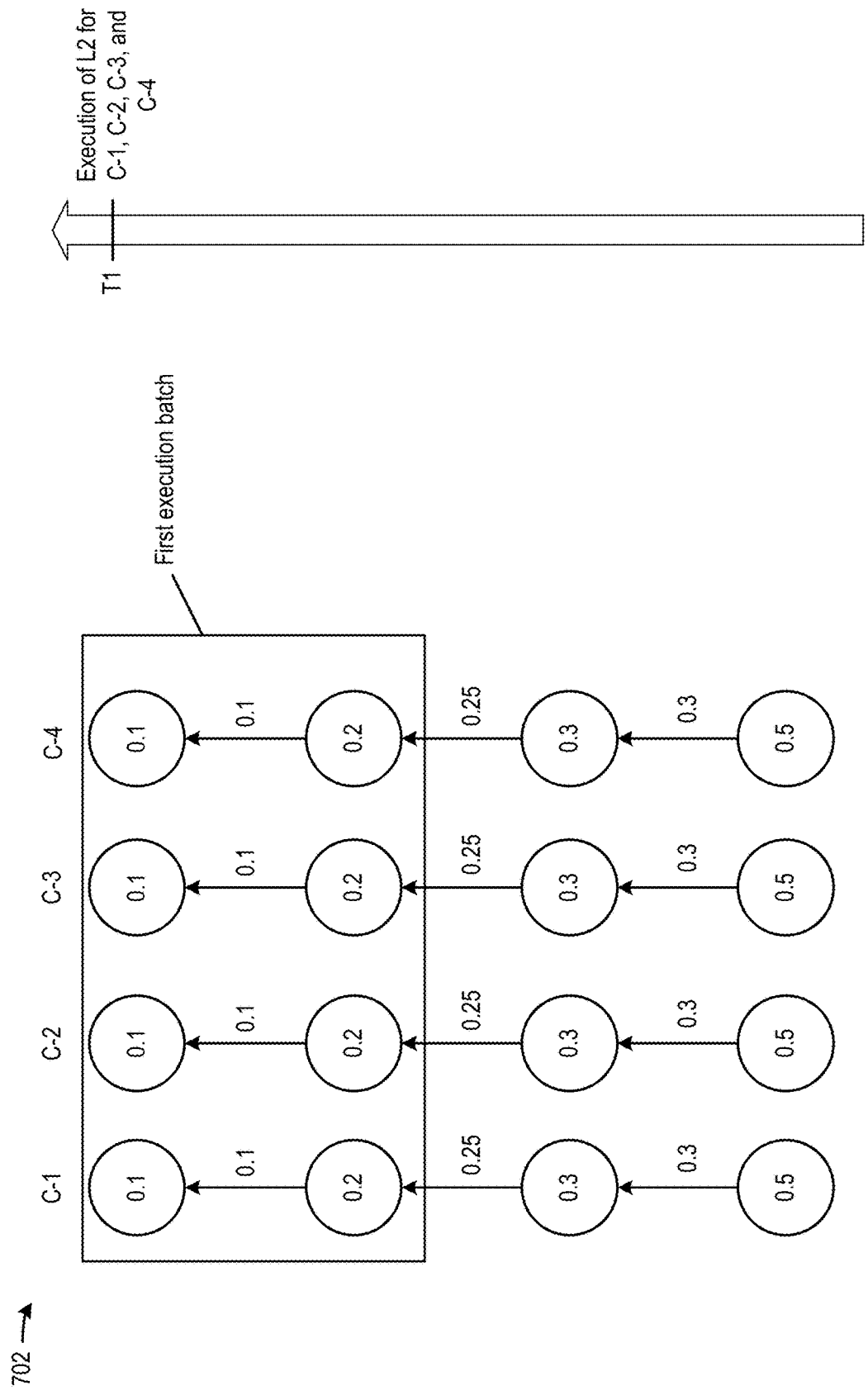

FIG. 7B illustrates scheduling operations 702. In operations 702, the scheduler determines a first batch size for L2 computations. To support concurrent L2 computations for C-1, C-2, C-3, and C-4, the state buffer needs to have the capacity to store the input data and output data of the concurrent L2 computations. The input data include the L1 output data for the four contexts with a total size of 0.8 units (0.2×4) and the shared weight of 0.1 units, whereas the output data size is 0.4 units (0.1×4). The required capacity is 1.3 units (0.8+0.4+0.1), which is below the capacity (2 units) of the state buffer. Based on this, the scheduler can include the L2 computation tasks for all four contexts in a first execution batch to be executed at time T1.

Figure 7C:
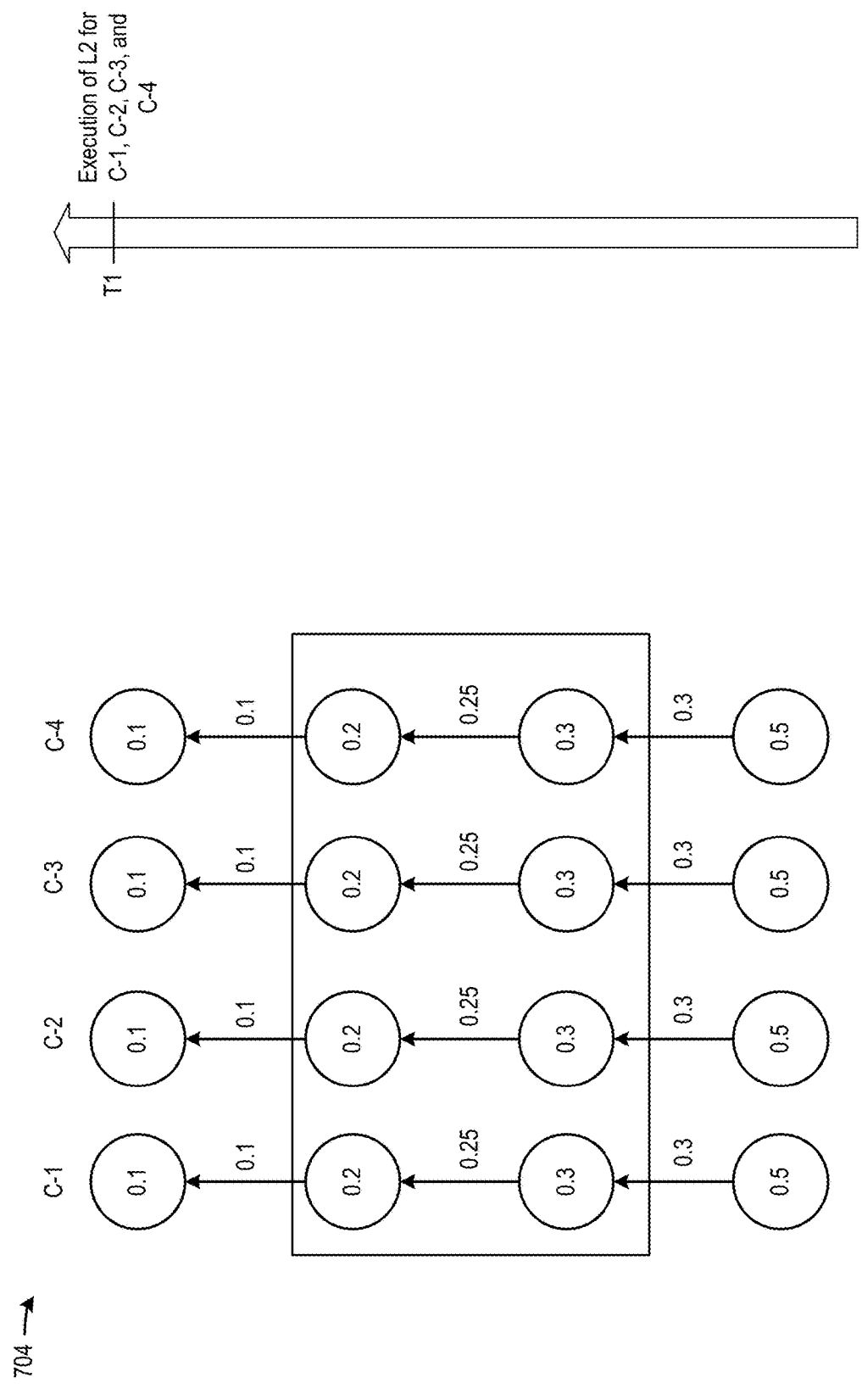
Figure 7D:
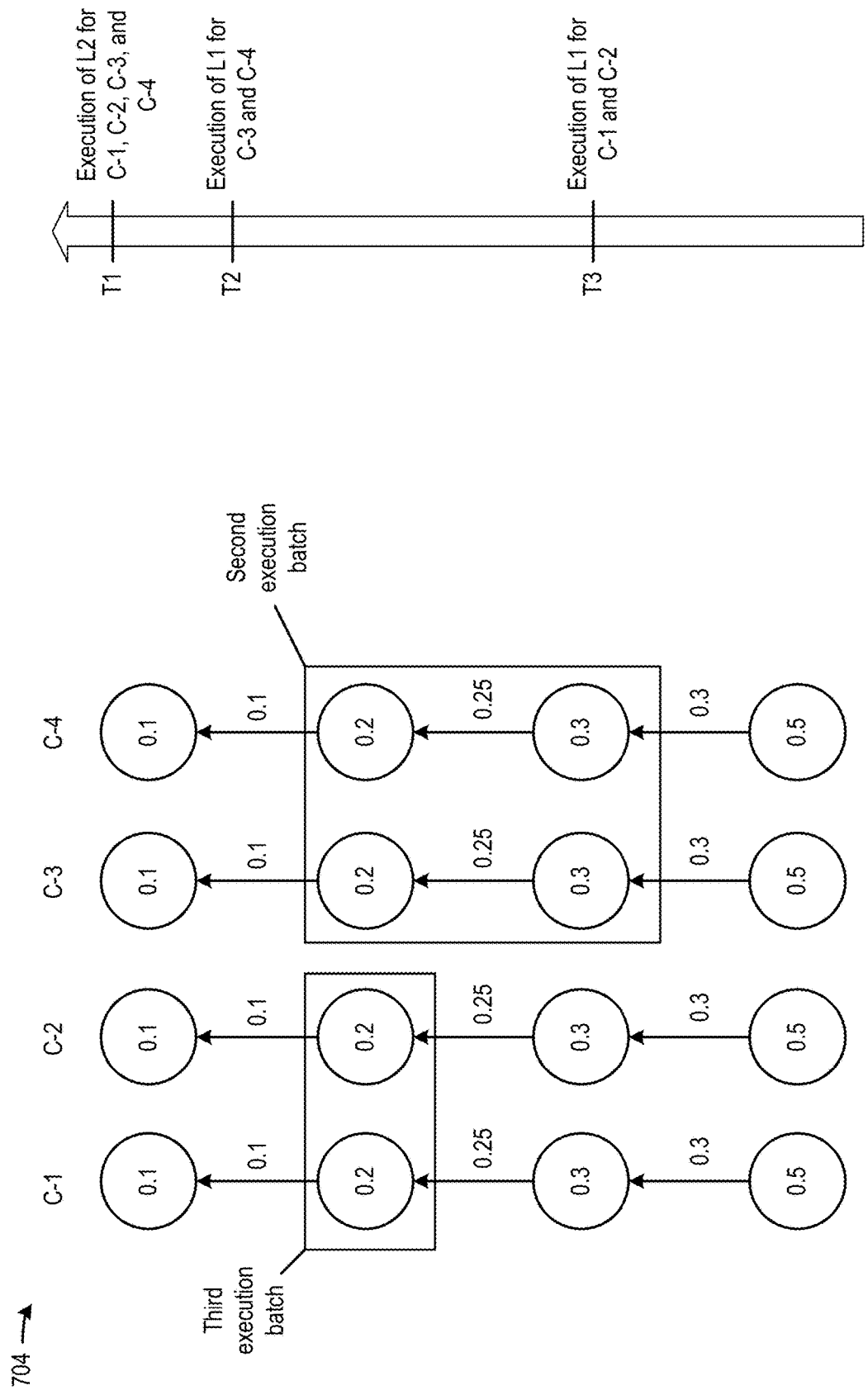

FIGS. 7C and 7D illustrate scheduling operations 704. In operations 704, the scheduler determines whether the L1 computations of the four contexts can be performed in a second execution batch. The scheduler can determine whether the state buffer has the capacity to store the input data and output data of the concurrent L1 computations for all four contexts. Referring to FIG. 7C, the input data include the L0 output data for the four contexts with a total size of 1.2 units (0.3×4) and the shared weight of size of 0.25 units, whereas the output data size is 0.8 units (0.2×4). The required capacity is 2.25 units (1.2+0.8+0.25), which exceeds the capacity of the state buffer. Based on this determination, the scheduler can split the L1 computations into more than one execution batches. For example, the scheduler may determine a number of L1 computation tasks that can be included in an execution batch based on the state buffer having sufficient capacity to store the input data and output data of the number of L1 computation tasks in that execution batch, and the output data of L1 computation tasks of an earlier execution batch.

As an illustrative example, referring to FIG. 7D, the scheduler may determine a second execution batch comprising the L1 computation tasks for C-2 and C-3, and a third execution batch comprising the L1 computation tasks for C-1 and C-2. The third execution batch is to be executed before the second execution batch. The total input and output data size of the second execution batch can be 1.25 units (0.2×2+0.3×2+0.25), whereas the output data size of the third execution batch is 0.4 units (0.2×2). Based on the total data size (1.65 units) being smaller than the capacity of the state buffer, the scheduler schedules the second execution batch at time T2 and the third execution batch at time T3.

Figure 7E:
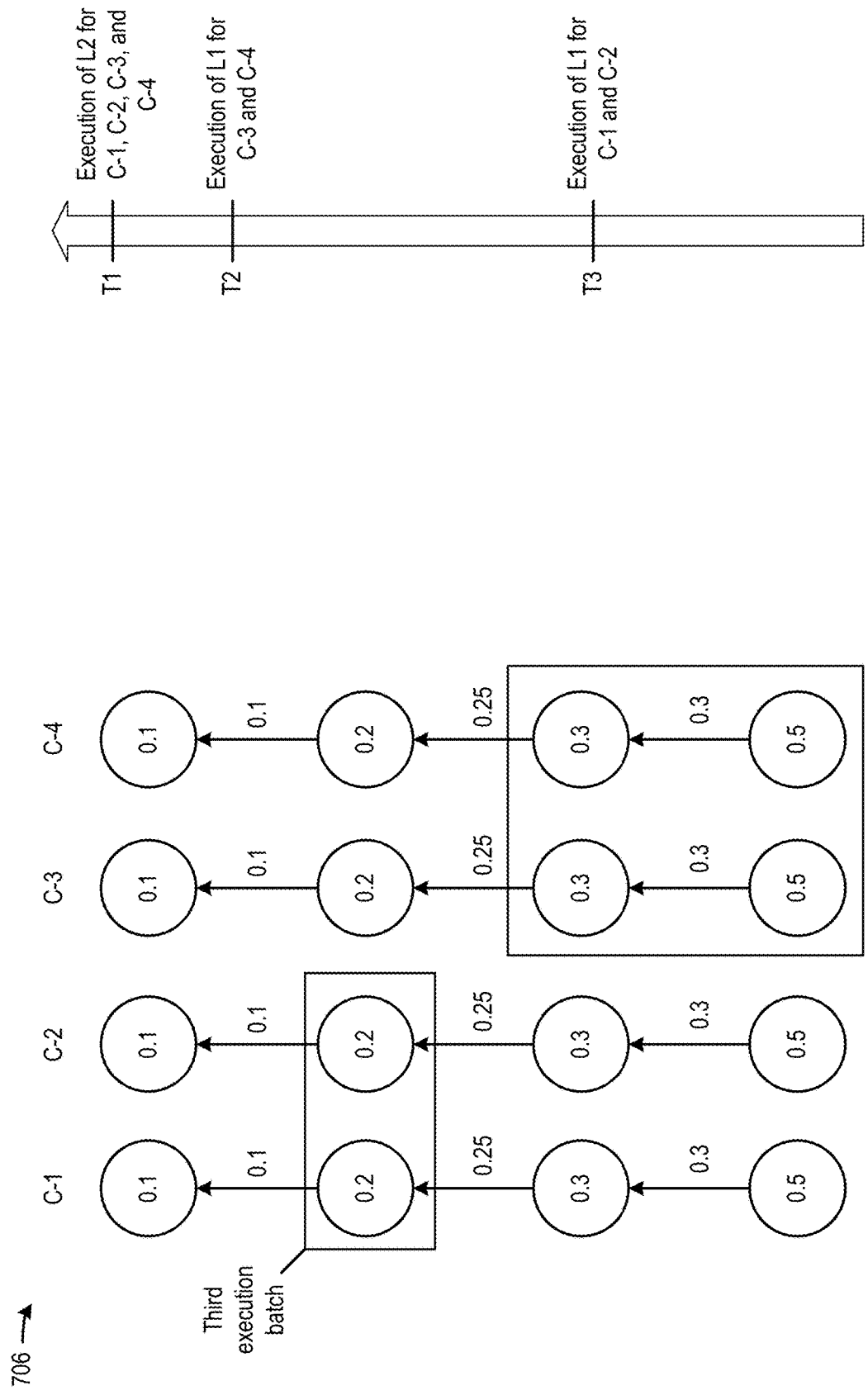
Figure 7F:
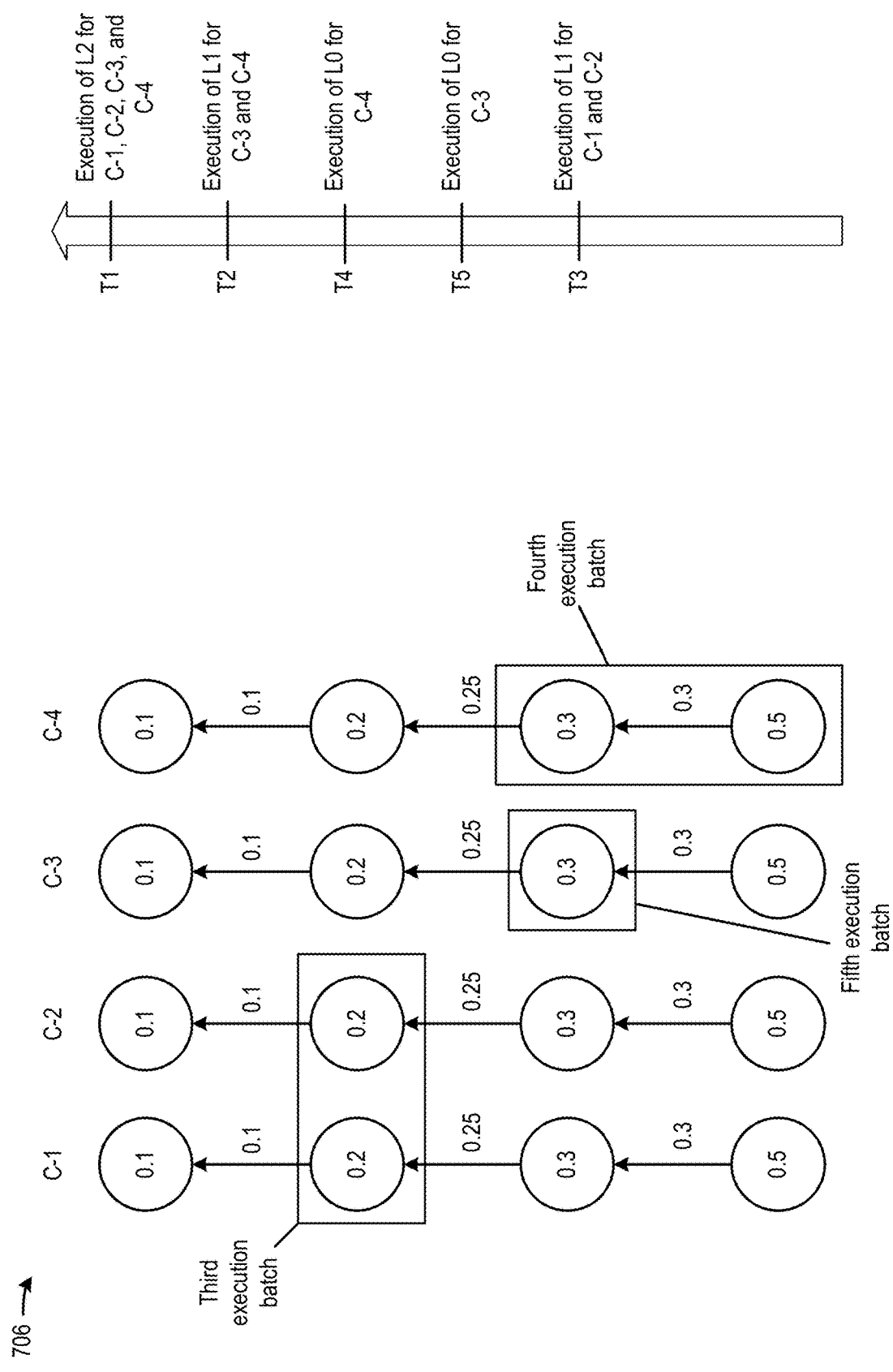

FIGS. 7E and 7F illustrate scheduling operations 706. In operations 706, the scheduler determines whether the L0 computations for C-2 and C-3 (to provide the input data for the second execution batch) can be performed in parallel as a single batch. Referring to FIG. 7E, to support parallel L0 computations for C-2 and C-3, which are to be performed between times T1 and T2 (to avoid the state buffer having to store the output of L0 computations for C-1, C-2, C-3, and C-4), the state buffer needs to store the input and output data of parallel L0 computations for C-2 and C-3 as well as the output data of the third execution batch. The total input and output data size of the L0 computations for C-2 and C-3 is 1.9 units (0.5×2+0.3×2+0.3), whereas the output data size of the third execution batch is 0.4 units. Based on the total data size (2.3 units) exceeding the capacity of the state buffer, the scheduler determines to split the L0 computations into two batches. For example, referring to FIG. 7F, the scheduler may determine a fourth execution batch comprising the L0 computation for C-4, and a fifth execution batch comprising the L0 computation for C-3. The scheduler may also determine that the state buffer has sufficient capacity to store the input data and output data for the fourth execution batch (with a data size of 1.3 units), the output data for the fifth execution batch (with a data size of 0.3 units), and the output data of the third execution batch (with a data size of 0.4 units), all of which having a combined data size of 2 units. The scheduler can then schedule the fourth execution batch at time T4 and the fifth execution batch at time T5.

Figure 7G:
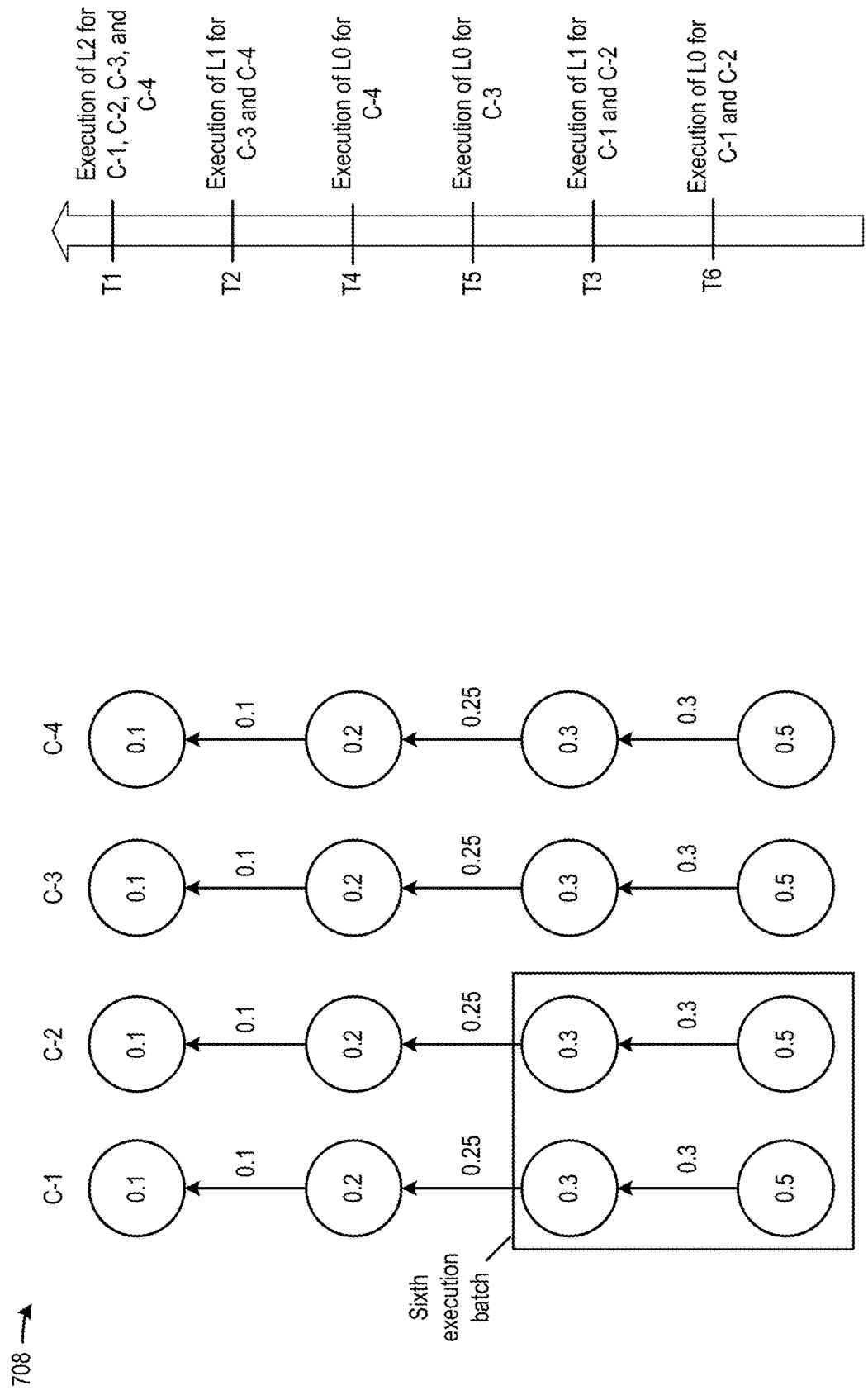

FIG. 7G illustrates scheduling operations 708. In operations 708, the scheduler determines whether the L0 computations for C-1 and C-2 (to provide the input data for the third execution batch) can be performed in parallel as a single batch. Referring to FIG. 7G, to support parallel L0 computations for C-1 and C-2, which are to be performed before the execution batches determined in operations 702-706, the state buffer needs to store the input and output data of parallel L0 computations for C-1 and C-2. The total input and output data size of the L0 computations for C-1 and C-2 is 1.9 units (0.5×2+0.3×2+0.3), which is below the capacity of the state buffer. The scheduler can then include L0 computations for C-1 and C-2 in a sixth execution batch, and schedule the sixth execution batch at T6.

Figure 8:
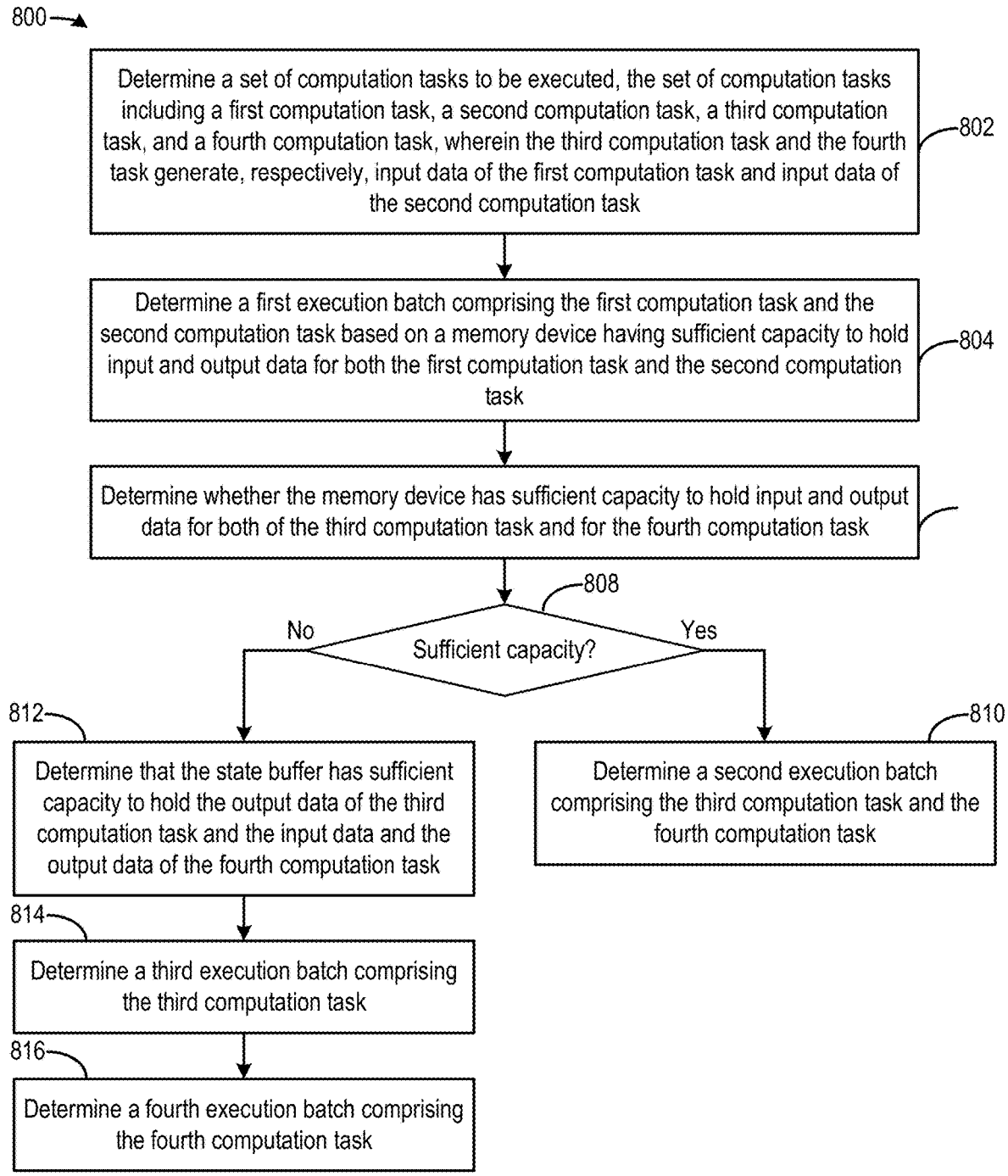
FIG. 8 illustrates an example flow diagram of scheduling the operations of a computing engine, according to certain aspects of the present disclosure.

FIG. 8 illustrates an example flow diagram of a process 800 for scheduling the operations at a computing engine (e.g., computing engine 324) coupled with a memory device (e.g., state buffer 322). The process may be implemented by various systems described above, such as, for example, scheduler module 332 of neural network processor 302.

At operation 802, the scheduler module may determine a set of computation tasks to be executed, the set of computation tasks including a first computation task, a second computation task, a third computation task, and a fourth computation task, wherein the third computation task and the fourth task generate, respectively, input data of the first computation task and input data of the second computation task.

At operation 804, the scheduling module may determine a first execution batch comprising the first computation task and the second computation task based on the state buffer having sufficient capacity to hold input and output data for both the first computation task and the second computation task.

At operation 806, the scheduling module may determine whether the memory device has sufficient capacity to hold input data and output data for both the third computation task and the fourth computation task. If the memory device has sufficient capacity to hold input data and output data for both the third computation task and the fourth computation task (at operation 808), the scheduling module may determine a second execution batch comprising the third computation task and the fourth computation task, and schedule the second execution batch to be executed before the first execution batch, at operation 810.

On the other hand, if the memory device does not have sufficient capacity to hold input data and output data for both the third computation task and the fourth computation task (at operation 808), but has sufficient capacity to hold the output data of the third computation task and the input data and the output data of the fourth computation task (at operation 812), the scheduling module may determine a third execution batch comprising the third computation task, at operation 814. The scheduling module may also determine a fourth execution batch comprising the fourth computation task at operation 816. The scheduling module may schedule the third execution batch to be executed first, followed by the fourth execution batch, followed by the first execution batch.

In the example process 800, the first computation task and the second computation task may be second neural network layer computation tasks for, respectively, a first context and a second context. Moreover, the third computation task and the fourth computation task may be first neural network layer computation tasks for, respectively, the first context and the second context.

Figure 9:
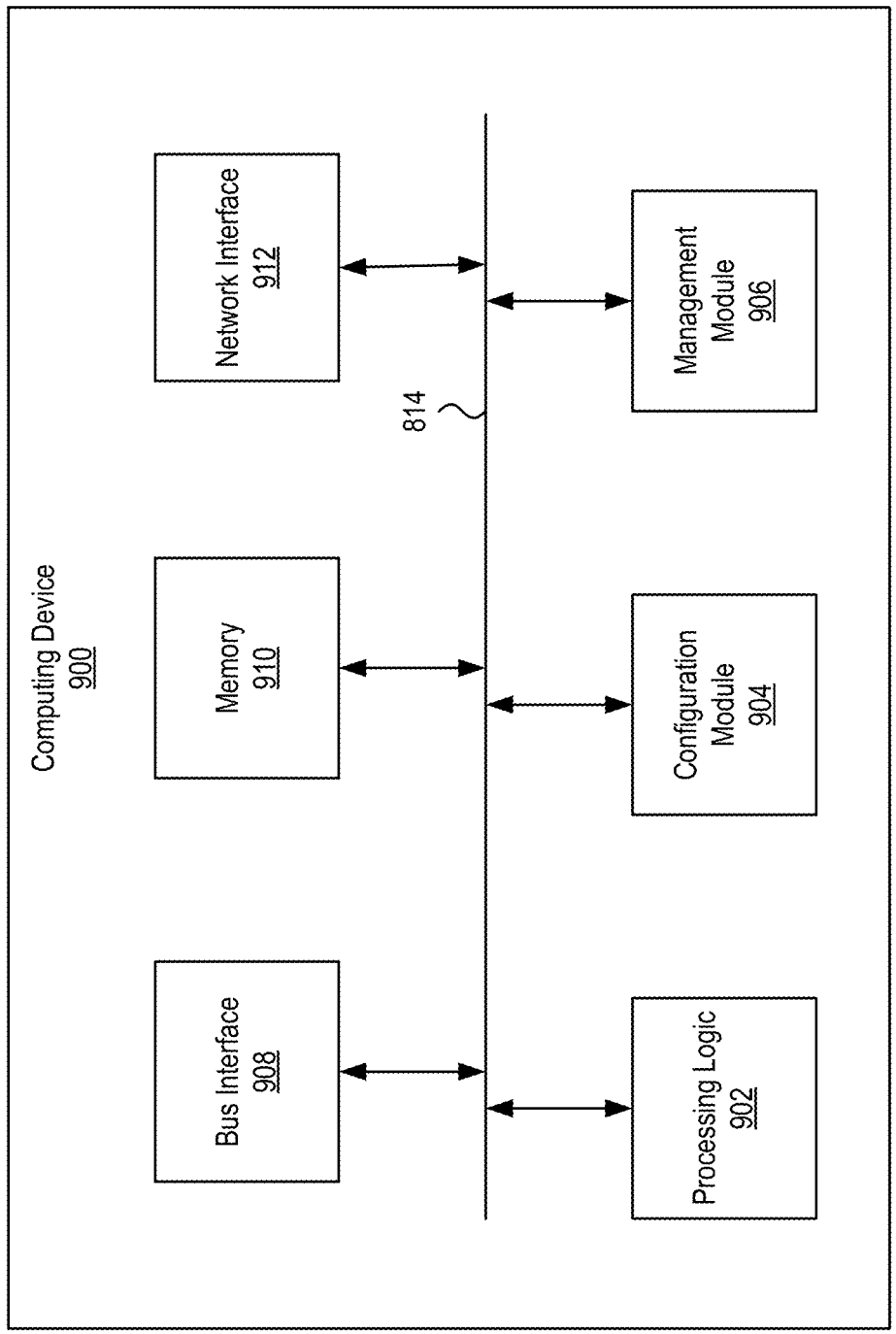
FIG. 9 illustrates an example of a computing device, according to certain aspects of the disclosure.

FIG. 9 illustrates an example of a computing device 900. Functionality and/or several components of the computing device 900 may be used without limitation with other embodiments disclosed elsewhere in this disclosure, without limitations. A computing device 900 may perform computations to facilitate processing of a task. As an illustrative example, computing device 900 can be part of a server in a multi-tenant compute service system. Various hardware and software resources of computing device 900 (e.g., the hardware and software resources associated with provision of an image recognition service) can be allocated to a client upon request.

In one example, the computing device 900 may include processing logic 902, a bus interface module 908, memory 910, and a network interface module 912. These modules may be hardware modules, software modules, or a combination of hardware and software. In certain instances, modules may be interchangeably used with components or engines, without deviating from the scope of the disclosure. The computing device 900 may include additional modules, not illustrated here. In some implementations, the computing device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910. Processing logic 902 may also include hardware circuities for performing artificial neural network computation including, for example, SoC 302, etc.

The access to processing logic 902 can be granted to a client to provide the personal assistant service requested by the client. For example, computing device 900 may host a virtual machine, on which an image recognition software application can be executed. The image recognition software application, upon execution, may access processing logic 902 to predict, for example, an object included in an image. As another example, access to processing logic 902 can also be granted as part of bare-metal instance, in which an image recognition software application executing on a client device (e.g., a remote computer, a smart phone, etc.) can directly access processing logic 902 to perform the recognition of an image.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computing device 900, while in other cases some or all of the memory may be external to the computing device 900. The memory 910 may store an operating system comprising executable instructions that, when executed by the processing logic 902, provides the execution environment for executing instructions providing networking functionality for the computing device 900. The memory 910 may also store, for example, software applications for performing artificial neural network computation. For example, memory 910 may store software routines related to the computations of equations 1-4 above. In a case where processing logic 902 is in the form of FPGA, memory 910 may store netlists data representing various logic circuit components of processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 900 may include a network interface module for communicating with a wired Ethernet network, a wireless 802.11 network, a cellular network, an Infiniband network, etc. In some embodiments, computing device 900 may receive a set of parameters, such as the aforementioned weight vectors for generation of forget gate factor, input factor, output factor, etc. from a server through network interface module 912.

The various components and modules of the computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of processing data, comprising:
setting a computing engine in a first configuration to implement a first layer of a neural network;
processing first data related to a first context using the computing engine in the first configuration to generate a first layer output of the first context;
setting the computing engine in a second configuration to implement a second layer of the neural network;
processing the first layer output of the first context using the computing engine in the second configuration to generate a second layer output of the first context;
switching the computing engine from the second configuration back to the first configuration;
processing second data related to a second context using the computing engine in the first configuration to generate a first layer output of the second context;
setting the computing engine back to the second configuration to implement the second layer of the neural network;
processing the first layer output of the second context in the second configuration to generate a second layer output of the second context;
setting the computing engine in a third configuration to implement a third layer of the neural network; and
processing the second layer output of the first context and the second layer output of the second context using the computing engine in the third configuration to generate a third layer output of the first context and a third layer output of the second context.

2. The method of claim 1, further comprising:
processing third data related to a third context using the computing engine in the first configuration to generate a first layer output of the third context; and
processing the first layer output of the third context and the first layer output of the first context using the computing engine in the second configuration to generate, respectively, a second layer output of the third context and the second layer output of the first context.

3. The method of claim 2, further comprising:
storing the first layer output of the first context and the first layer output of the third context in a memory device;
configuring a first portion of the computing engine to receive the first layer output of the first context from the memory device as input;
configuring a second portion of the computing engine to receive the first layer output of the third context from the memory device as input;
processing the first layer output of the first context using the first portion of the computing engine; and processing the first layer output of the third context using the second portion of the computing engine.

4. The method of claim 3, wherein the processing of the first layer output of the first context using the first portion of the computing engine and the processing of the first layer output of the third context using the second portion of the computing engine are performed in parallel.

5. The method of claim 1, further comprising:
processing fourth data related to a fourth context using the computing engine in the first configuration to generate a first layer output of the fourth context; and
processing the first layer output of the second context and the first layer output of the fourth context using the computing engine in the second configuration to generate, respectively, the second layer output of the second context and a second layer output of the fourth context.

6. The method of claim 5, further comprising:
storing the first layer output of the second context and the first layer output of the fourth context in a memory device;
configuring a first portion of the computing engine to receive the first layer output of the second context from the memory device as input;
configuring a second portion of the computing engine to receive the first layer output of the fourth context from the memory device as input;
processing the first layer output of the second context using the first portion of the computing engine; and
processing the first layer output of the fourth context using the second portion of the computing engine.

7. The method of claim 6, wherein the processing of the first layer output of the second context using the first portion of the computing engine and the processing of the first layer output of the fourth context using the second portion of the computing engine are performed substantially in parallel.

8. The method of claim 1, further comprising:
storing, at a memory device, the second layer output of the first context;
storing, at the memory device in addition to the second layer output of the first context, the second data related to the second context; and
storing, at the memory device in addition to the second layer output of the first context and the second data related to the second context, the first layer output of the second context.

9. The method of claim 8, further comprising:
overwriting at least a part of the second data related to the second context or the first layer output of the second context stored at the memory device with the second layer output of the second context.

10. The method of claim 9, further comprising:
configuring a third portion of the computing engine to receive the second layer output of the first context from the memory device as input;
configuring a fourth portion of the computing engine to receive the second layer output of the second context from the memory device as input;
processing the second layer output of the first context using the third portion of the computing engine; and
processing the second layer output of the second context using the fourth portion of the computing engine.

11. The method of claim 10, wherein the processing of the second layer output of the first context using the third portion of the computing engine and the processing of the second layer output of the second context using the fourth portion of the computing engine are performed substantially in parallel.

12. The method of claim 1, wherein processing the first data related to the first context using the computing engine in the first configuration to generate the first layer output of the first context comprises:
performing one or more convolution computations between the first data and a set of weights associated with the first layer of the neural network.

13. The method of claim 12, further comprising:
processing results of the one or more convolution computations by an activation function engine to generate the first layer output of the first context.

* * * * *